(12) United States Patent
Junge et al.

(10) Patent No.: US 10,723,950 B2
(45) Date of Patent: Jul. 28, 2020

(54) LIQUID-CRYSTALLINE MIXTURES

(71) Applicant: MERCK PATENT GMBH, Darmstadt (DE)

(72) Inventors: Michael Junge, Pfungstadt (DE); Ursula Patwal, Reinheim (DE); Peer Kirsch, Seeheim-Jugenheim (DE)

(73) Assignee: MERCK PATENT GMBH, Darmstadt (DE)

(*) Notice: Subject to any disclaimer, the term of this patent is extended or adjusted under 35 U.S.C. 154(b) by 106 days.

(21) Appl. No.: 16/066,953

(22) PCT Filed: Dec. 12, 2016

(86) PCT No.: PCT/EP2016/002091
§ 371 (c)(1),
(2) Date: Jun. 28, 2018

(87) PCT Pub. No.: WO2017/118464
PCT Pub. Date: Jul. 13, 2017

(65) Prior Publication Data
US 2019/0016955 A1 Jan. 17, 2019

(30) Foreign Application Priority Data

Jan. 6, 2016 (EP) .................................. 16150279
Apr. 22, 2016 (EP) .................................. 16166708

(51) Int. Cl.
*G02F 1/1333* (2006.01)
*C09K 19/30* (2006.01)
*C09K 19/32* (2006.01)
*C09K 19/34* (2006.01)

(52) U.S. Cl.
CPC ...... *C09K 19/3068* (2013.01); *C09K 19/3001* (2013.01); *C09K 19/3003* (2013.01); *C09K 19/3098* (2013.01); *C09K 19/321* (2013.01); *C09K 19/322* (2013.01); *C09K 19/34* (2013.01); *C09K 19/3402* (2013.01); *C09K 19/3491* (2013.01); *C09K 2019/3004* (2013.01); *C09K 2019/3006* (2013.01); *C09K 2019/3071* (2013.01); *C09K 2019/325* (2013.01); *C09K 2019/3422* (2013.01); *C09K 2219/13* (2013.01)

(58) Field of Classification Search
CPC .......... C09K 19/3068; C09K 19/3001; C09K 19/3003; C09K 19/3098; C09K 19/321; C09K 19/322; C09K 19/34; C09K 19/3402; C09K 19/3491; C09K 2019/3004; C09K 2019/3006; C09K 2019/3071; C09K 2019/325; C09K 2019/3422; C09K 2219/13; G02F 1/1333
USPC ..................................................... 252/299.63
See application file for complete search history.

(56) References Cited

U.S. PATENT DOCUMENTS 6,027,665 A * 2/2000 Pausch ............... C09K 19/3001
                                                        252/299.61
2013/0083284 A1   4/2013  Junge
2016/0257885 A1   9/2016  Junge
2016/0319592 A1  11/2016  Junge
2017/0029702 A1   2/2017  Junge

FOREIGN PATENT DOCUMENTS

| WO | 2011154077 A1 | 12/2011 |
| WO | 2015055274 A1 | 4/2015 |
| WO | 2015090506 A1 | 6/2015 |
| WO | 2015154848 A1 | 10/2015 |

OTHER PUBLICATIONS

International Search Report PCT/EP2016/002091 dated Feb. 9, 2018.

* cited by examiner

*Primary Examiner* — Geraldina Visconti
(74) *Attorney, Agent, or Firm* — Millen White Zelano & Branigan

(57) ABSTRACT

The present application relates to mixtures which have liquid-crystalline properties. The application furthermore relates to the use of the mixtures in devices which regulate the transmission of light through an area element.

20 Claims, No Drawings

LIQUID-CRYSTALLINE MIXTURES

The present application relates to a mixture comprising one or more compounds selected from compounds of the formulae (1) and (2) shown below, and to the use of this mixture in a device for regulating the passage of light through an area element.

For the purposes of the present application, the term light is taken to mean, in particular, electromagnetic radiation in the UV-A, VIS and NIR regions, i.e. in accordance with the usual definitions light having a wavelength of 320 nm to 2000 nm.

The light whose passage is regulated by the device according to invention is preferably taken to mean sunlight. Sunlight preferably emanates directly from the sun. However, it may also emanate indirectly from the sun via reflection, refraction, or via absorption and subsequent emission by any desired materials.

The devices according to the invention are correspondingly preferably used to regulate the passage of sunlight through an area element, in particular to regulate the passage of sunlight through an area element into a substantially sealed-off space element. Devices of this type are also known under the generic term switchable windows or smart windows. These are reviewed, for example, in B. Jelle et al., Solar Energy Materials & Solar Cells 2012, pp. 1-28. The term switchable window here also encompasses switchable light-transmitting roofs, for example skylights or automobile roofs.

One variant of these switchable windows uses liquid-crystalline materials which comprise dyes. Examples of devices of this type are described, inter alia, in WO 2009/141295.

There continues to be a need for novel materials, in particular for the above-mentioned use. Desired properties here are a broad liquid-crystalline phase of the material, in particular a high clearing point of 100° C. or higher, and a small value for the refractive index anisotropy Δn, in particular a value of Δn of less than 0.065. Low values for Δn are desired, in particular, in applications in which the thickness of the layer comprising the liquid-crystalline material is high.

Further desired technical properties are good solubility of dyes in the liquid-crystalline material, good solution stability of dyes in the liquid-crystalline material, in particular long-lasting good and complete solubility in the liquid-crystalline material, high light stability of the liquid-crystalline material, in particular of the liquid-crystalline material comprising dyes, a high degree of order for dichroic dyes, and low dispersion of the refractive indices and of the value for Δn.

Surprisingly, it has been found that a mixture, as described below, has at least one, preferably several, of the desirable properties mentioned above.

The present invention thus relates to a mixture comprising one or more compounds which conform to a formula (1) or a formula (2),

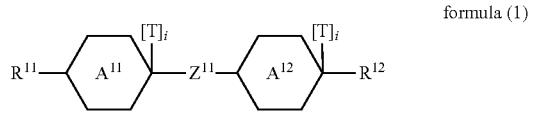

formula (1)

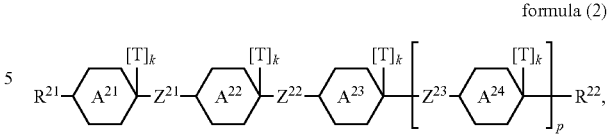

formula (2)

where the following applies to the variables occurring:
$A^{11}$, $A^{12}$, $A^{21}$, $A^{22}$, $A^{23}$, $A^{24}$ are selected from

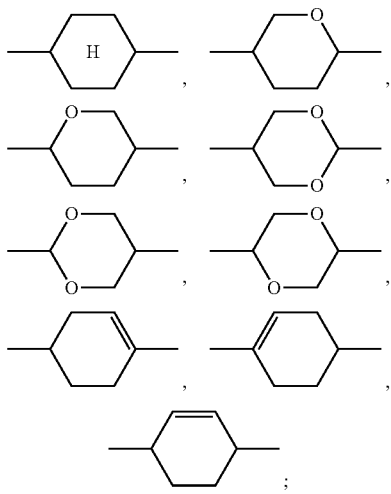

$Z^{11}$, $Z^{21}$, $Z^{22}$, $Z^{23}$ are selected from a single bond, —(C=O)—O—, —O—(C=O)—, —CF$_2$—O—, —O—CF$_2$—, —O—CH$_2$—, —CH$_2$—O— and —CH$_2$—CH$_2$—;

$R^{11}$, $R^{12}$, $R^{21}$, $R^{22}$ are selected on each occurrence, identically or differently, from H, F, Cl, CN, NCS, alkyl groups having 1 to 10 C atoms, alkoxy groups having 1 to 10 C atoms, thioalkoxy groups having 1 to 10 C atoms, alkenyl groups having 2 to 10 C atoms and alkenyloxy groups having 2 to 10 C atoms, where one or more H atoms in the alkyl, alkoxy, thioalkoxy, alkenyl and alkenyloxy groups may be replaced by F, Cl or CN;

T is selected from —CN, F, —N$_3$, —NCS, NO$_2$, —C≡C—R$^3$, alkyl groups having 1 to 10 C atoms and alkoxy groups having 1 to 10 C atoms, where one or more H atoms in the alkyl and alkoxy groups may be replaced by F, Cl or CN;

R$^3$ is selected from H, CN, alkyl groups having 1 to 10 C atoms, where one or more C atoms in the alkyl groups may be replaced by F, Cl or CN, and —C≡C—R$^4$;

R$^4$ is selected from H, CN, and alkyl groups having 1 to 10 C atoms, where one or more C atoms in the alkyl groups may be replaced by F, Cl or CN;

i is on each occurrence, identically or differently, 0 or 1, where the sum of the indices i in a formula is at least equal to 1;

k is on each occurrence, identically or differently, 0 or 1, where the sum of the indices k in a formula is at least equal to 1;

p is equal to 0 or 1;

and one or more compounds of the formula (3)

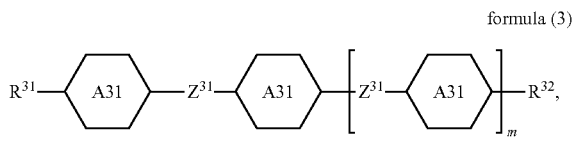

where the following applies to the variables occurring:
A31 is selected on each occurrence, identically or differently, from

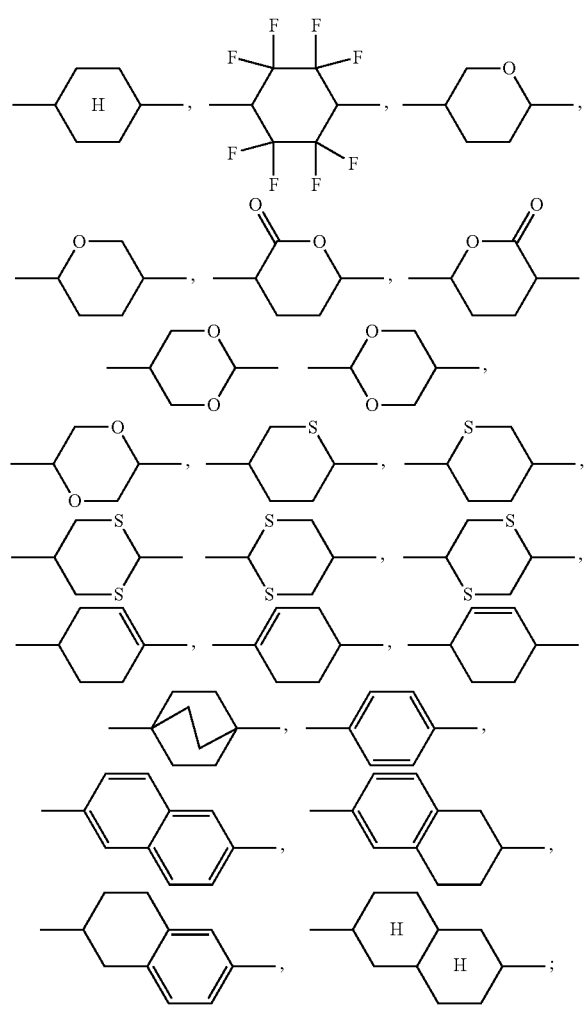

$R^{31}$ and $R^{32}$ are selected on each occurrence, identically or differently, from H, F, Cl, CN, NCS, alkyl groups having 1 to 10 C atoms, alkoxy groups having 1 to 10 C atoms, thioalkoxy groups having 1 to 10 C atoms, alkenyl groups having 2 to 10 C atoms and alkenyloxy groups having 2 to 10 C atoms, where one or more H atoms in the alkyl, alkoxy, thioalkoxy, alkenyl and alkenyloxy groups may be replaced by F, Cl or CN;
$Z^{31}$ is selected on each occurrence, identically or differently, from a single bond, —(C=O)—O—, —O—(C=O)—, —CF$_2$—O—, —O—CF$_2$—, —O—CH$_2$—, —CH$_2$—O— and —CH$_2$—CH$_2$—;
m is equal to 0, 1, 2 or 3;

where the sum of the proportions of the compounds of the formula (1), the compounds of the formula (2) and the compounds of the formula (3) in the mixture is at least 58%,
and where one or both of the following conditions a) and b) are satisfied: a) the mixture comprises one or more compounds V which contain four or more rings,
b) the mixture comprises a proportion of at least 25% of compounds of the formula (2).

When quoting proportions of compounds in mixtures in %, percent in the present application is taken to mean percent by weight.

In order to improve the legibility in running text in the present application, rings

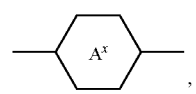

for example

are abbreviated to "$A^x$", for example "$A^{11}$".
The notation

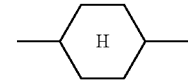

in the present application is taken to mean 1,4-cyclohexylene.

In the present application, alkyl groups, alkoxy groups, thioalkoxy groups, alkenyl groups and alkenyloxy groups are preferably taken to mean the following groups: methyl, ethyl, n-propyl, i-propyl, cyclopropyl, n-butyl, i-butyl, s-butyl, t-butyl, cyclobutyl, 2-methylbutyl, n-pentyl, s-pentyl, cyclopentyl, neopentyl, n-hexyl, cyclohexyl, neohexyl, n-heptyl, cycloheptyl, n-octyl, cyclooctyl, 2-ethylhexyl, trifluoromethyl, pentafluoroethyl, 2,2,2-trifluoroethyl, ethenyl, propenyl, butenyl, pentenyl, cyclopentenyl, hexenyl, cyclohexenyl, heptenyl, cycloheptenyl, octenyl, cyclooctenyl, methoxy, trifluoromethoxy, ethoxy, n-propoxy, i-propoxy, n-butoxy, i-butoxy, s-butoxy, t-butoxy, n-pentoxy, s-pentoxy, 2-methylbutoxy, n-hexoxy, cyclohexyloxy, n-heptoxy, cycloheptyloxy, n-octyloxy, cyclooctyloxy, 2-ethylhexyloxy, pentafluoroethoxy, 2,2,2-trifluoroethoxy, methylthio, ethylthio, n-propylthio, i-propylthio, n-butylthio, i-butylthio, s-butylthio, t-butylthio, n-pentylthio, s-pentylthio, n-hexylthio, cyclohexylthio, n-heptylthio, cycloheptylthio, n-octylthio, cyclooctylthio, 2-ethylhexylthio, trifluoromethylthio, pentafluoroethylthio, 2,2,2-trifluoroethylthio.

The mixture is preferably a liquid-crystalline material. In the present application, this is taken to mean that it has liquid-crystalline properties, in particular nematic liquid-crystalline properties, in at least one temperature range.

The mixture according to the invention is distinguished by a broad nematic liquid-crystalline phase. It preferably has a nematic liquid-crystalline phase from −40° C. to 100° C., particularly preferably to 105° C., very particularly preferably to 110° C. The mixture preferably has a clearing point of at least 100° C., particularly preferably a clearing point of at least 105° C., and very particularly preferably a clearing point of at least 110° C.

Furthermore, the mixtures according to the invention have a low value for the refractive index anisotropy Δn. This is preferably below 0.065, particularly preferably below 0.06, very particularly preferably below 0.055, and most preferably below 0.05.

The mixture preferably has a clearing point of at least 100° C. and a value for Δn of below 0.065. It particularly preferably has a clearing point of at least 105° C. and a value of Δn of below 0.06. It very particularly preferably has a clearing point of at least 110° C. and a value of Δn of below 0.055.

Furthermore, the mixtures have a long shelf life at low temperatures. Shelf life here is taken to mean, in particular, the property of not decomposing and not crystallising out. The mixtures according to the invention preferably have shelf lives of several weeks, preferably several months, at temperatures of less than −30° C., preferably at temperatures of less than −40° C.

The mixture preferably comprises both one or more compounds of the formula (1) and also one or more compounds of the formula (2). The proportion of the compounds of the formulae (1) and (2) together in the mixture is preferably 45% to 70%, particularly preferably 55% to 70%, very particularly preferably 60% to 70%.

It is furthermore preferred for compounds of the formula (1) to be present in the mixture in a proportion of at least 25%, particularly preferably at least 30%.

It is furthermore preferred for compounds of the formula (2) to be present in the mixture in a proportion of at least 25%, particularly preferably at least 30%.

The following preferences apply for the compounds of the formulae (1) and (2):

$A^{11}, A^{12}, A^{21}, A^{22}, A^{23}, A^{24}$ are preferably selected from

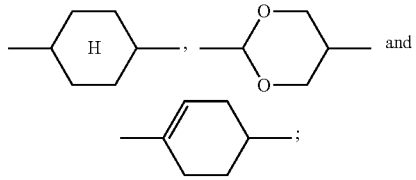

and particularly preferably are equal to

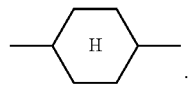

$Z^{11}, Z^{21}, Z^{22}, Z^{23}$ are preferably selected from a single bond, —O—CH$_2$— and —CH$_2$—CH$_2$—; they are particularly preferably a single bond.

Furthermore preferably, p is equal to 0.

Compounds of the formula (1) preferably conform to the formula (1-1)

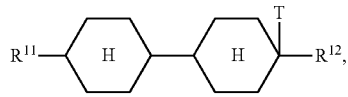

formula (1-1)

where the groups occurring are defined as for formula (1).

Compounds of the formula (2) preferably conform to the formula (2-1), the formula (2-2), the formula (2-3) or the formula (2-4)

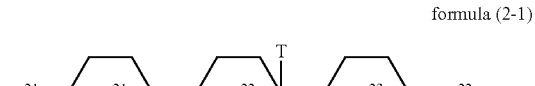

formula (2-1)

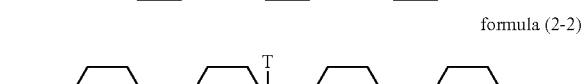

formula (2-2)

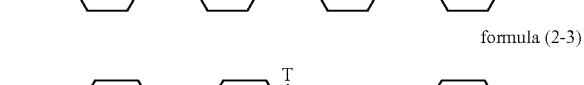

formula (2-3)

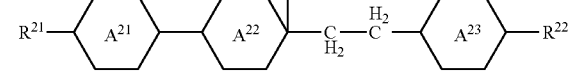

formula (2-4)

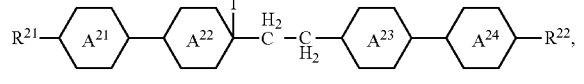

where the groups occurring are defined as for formula (2).

In formulae (2-1) and (2-2) and (2-4), $A^{21}$, $A^{22}$ and $A^{23}$ and, if present, $A^{24}$ are preferably equal to

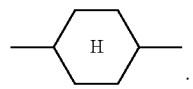

In formula (2-3), $A^{21}$ and $A^{22}$ are preferably equal to

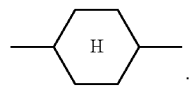

In formula (2-3), $A^{23}$ is preferably equal to

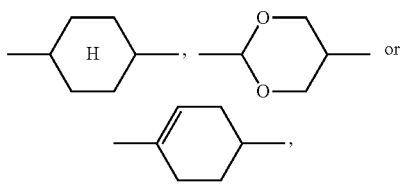

particularly preferably equal to

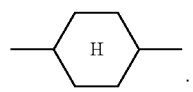

A particularly preferred embodiment of the formula (2) conforms to the formula (2-1-1)

formula (2-1-1)

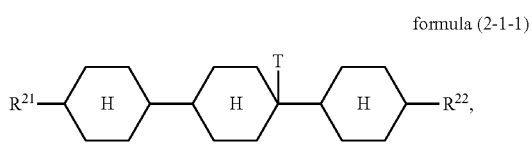

where the groups occurring are defined as for formula (2).

The condition for the mixture according to the invention that it has a proportion of at least 25% of compounds of the formula (2) preferably applies in such a way that it has a proportion of at least 25% of compounds of the formula (2-1-1).

T is preferably selected from CN, F, CF$_3$ and OCF$_3$. T is particularly preferably equal to CN.

Furthermore, R$^{11}$, R$^{12}$, R$^{21}$ and R$^{22}$ are preferably selected on each occurrence, identically or differently, from alkyl and alkoxy groups having 1 to 10 C atoms and alkenyl groups having 2 to 10 C atoms, particularly preferably from alkyl groups having 1 to 10 C atoms.

Particularly preferred compounds of the formulae (1) and (2) are shown below:

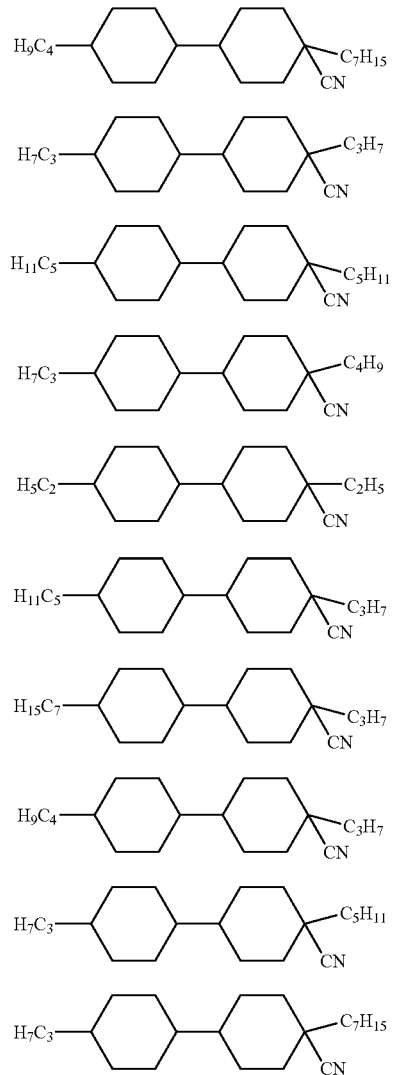

CCN-47

CCN-33

CCN-55

CCN-34

CCN-22

CCN-53

CCN-73

CCN-43

CCN-35

CCN-37

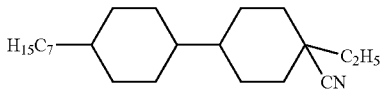

CCN-72

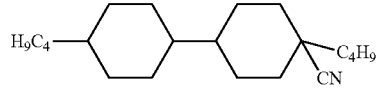

CCN-44

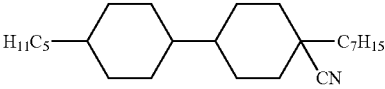

CCN-57

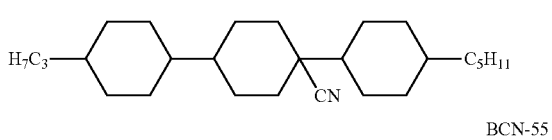

BCN-35

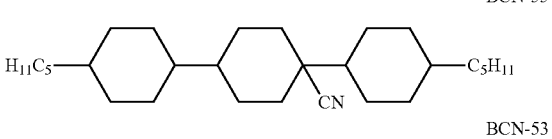

BCN-55

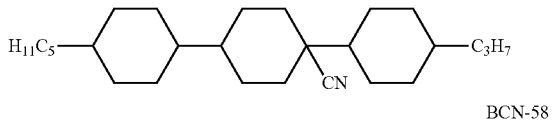

BCN-53

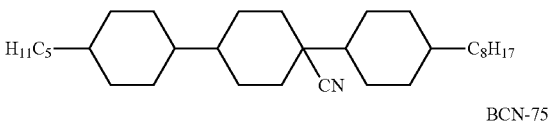

BCN-58

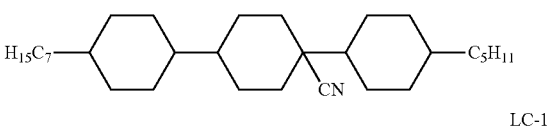

BCN-75

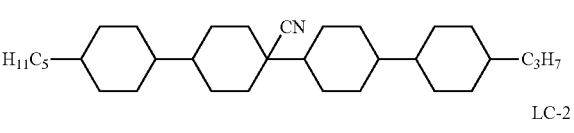

LC-1

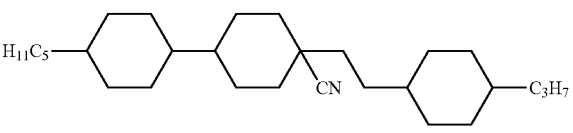

LC-2

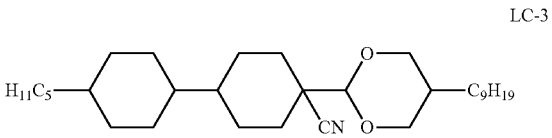

LC-3

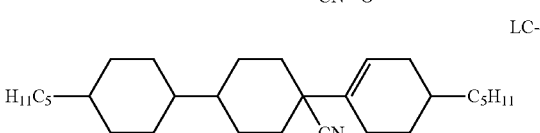

LC-4

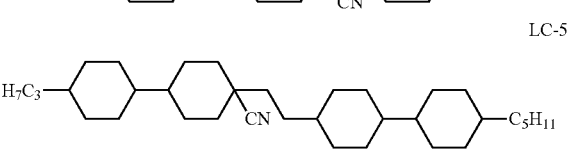

LC-5

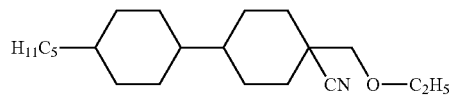

LC-6

It is furthermore preferred for the mixture to comprise one or more compounds V which contain four or more rings. The compound V preferably conforms to the formula (V)

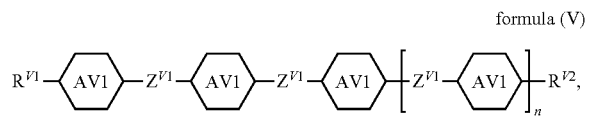

formula (V)

where the following applies to the variables occurring:

$R^{V1}$ and $R^{V2}$ are selected on each occurrence, identically or differently, from H, F, Cl, CN, NCS, alkyl groups having 1 to 10 C atoms, alkoxy groups having 1 to 10 C atoms, thioalkoxy groups having 1 to 10 C atoms, alkenyl groups having 2 to 10 C atoms and alkenyloxy groups having 2 to 10 C atoms, where one or more H atoms in the alkyl, alkoxy, thioalkoxy, alkenyl and alkenyloxy groups may be replaced by F, Cl or CN;

$A^{V1}$ is selected on each occurrence, identically or differently, from

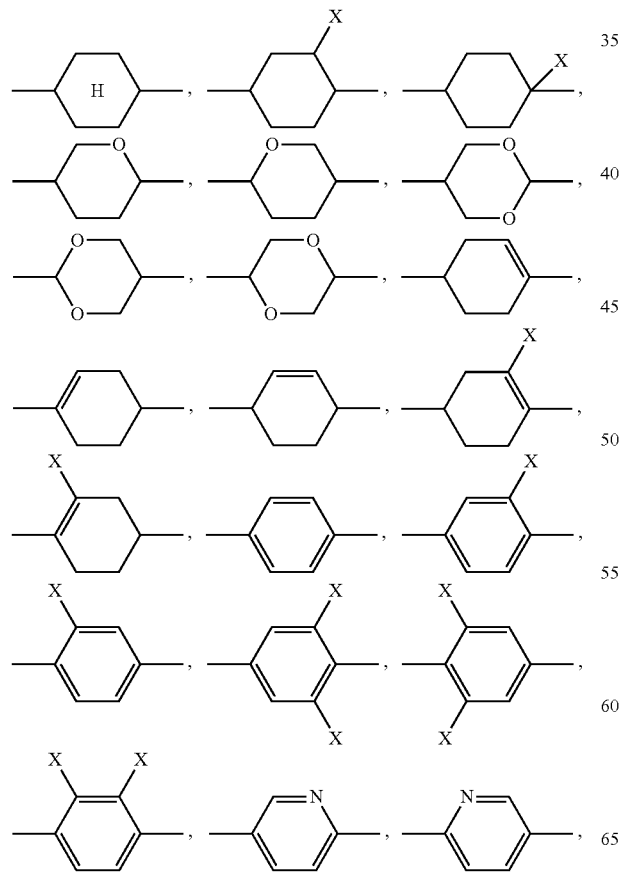

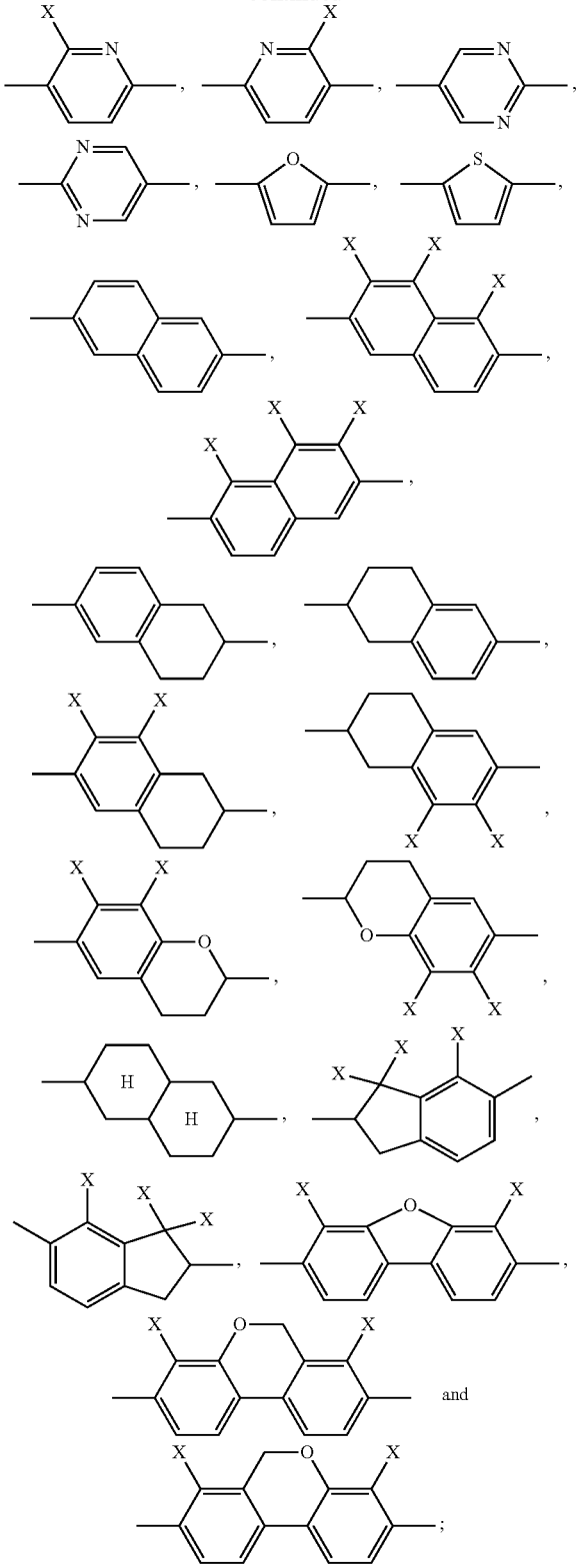

X is selected on each occurrence, identically or differently, from F, Cl, CN, alkyl groups having 1 to 10 C atoms, alkoxy groups having 1 to 10 C atoms and thioalkoxy groups having 1 to 10 C atoms, where one or more hydrogen atoms in the alkyl, alkoxy and thioalkoxy groups may be replaced by F or Cl, and where one or more $CH_2$ groups in the alkyl, alkoxy and thioalkoxy groups may be replaced by O or S;

$Z^{V1}$ is selected on each occurrence, identically or differently, from a single bond, —(C=O)—O—, —O—(C=O)—, —$CF_2$—O—, —O—$CF_2$—, —O—$CH_2$—, —$CH_2$—O— and —$CH_2$—$CH_2$—;

n is equal to 1, 2 or 3.

The compound V is preferably present in the mixture in a proportion of 0 to 15%, particularly preferably in a proportion of 1 to 10%, very particularly preferably in a proportion of 2 to 8%.

In the compound of the formula (V), n is preferably equal to 1.

Furthermore, $Z^{V1}$ is preferably selected from a single bond, —(C=O)—O— and —$CH_2$—O—.

Furthermore, $A^{V1}$ is preferably selected on each occurrence, identically or differently, from

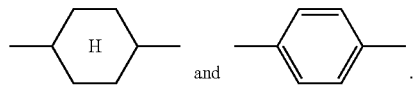

and

Furthermore preferably, $R^{V1}$ and $R^{V2}$ are alkyl groups having 1 to 10 C atoms.

A preferred embodiment of the formula (V) is the formula (V-1)

formula (V-1)

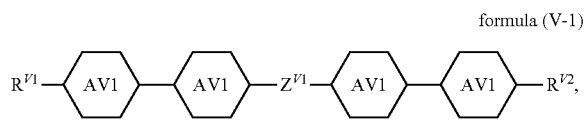

where $Z^{V1}$ is selected from —(C=O)—O— and —$CH_2$—O—, and where the other variables occurring are defined as for formula (V).

Preferred embodiments of compounds of the formula (V) are shown below:

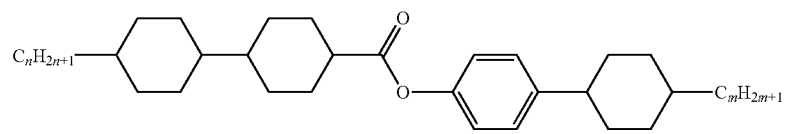

CCZPC-3-5 for n = 3 and m = 5
CCZPC-3-4 for n = 3 and m = 4
CCZPC-3-3 for n = 3 and m = 3

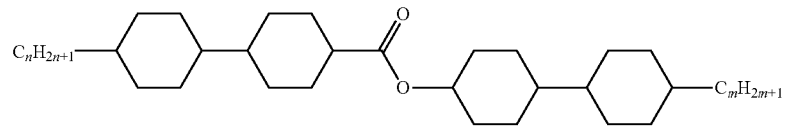

CCZCC-3-2 for n = 3 and m = 2
CCZCC-2-3 for n = 2 and m = 3
CCZCC-4-2 for n = 4 and m = 2
CCZCC-4-3 for n = 4 and m = 3

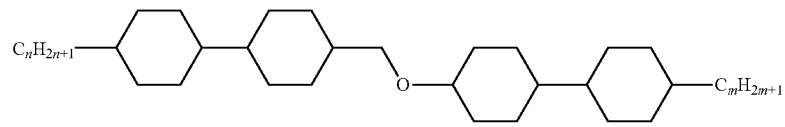

CCOCC-3-5 for n = 3 and m = 2
CCOCC-2-3 for n = 2 and m = 3
CCOCC-4-2 for n = 4 and m = 2

CCECC-3-3

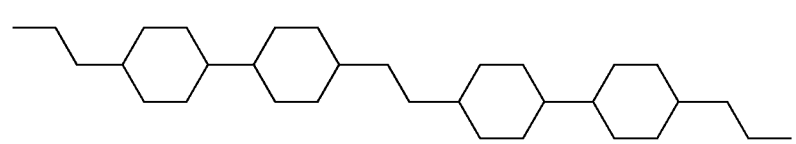

Compounds of the formula (3) are preferably present in the mixture in a proportion of 15 to 55%, particularly preferably in a proportion of 18 to 50%, very particularly preferably in a proportion of 25 to 40%.

The sum of the proportions of the compounds of the formula (1), formula (2) and formula (3) is preferably greater than 60%, particularly preferably greater than 70%, very particularly preferably greater than 80%. The sum of the proportions of the compounds of formula (1), formula (2) and formula (3) is most preferably greater than 95%.

In formula (3), $A^{31}$ is preferably selected on each occurrence, identically or differently, from

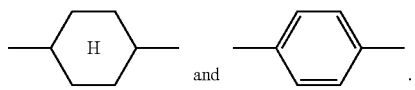

Furthermore, $Z^{31}$ is preferably selected on each occurrence, identically or differently, from a single bond and —(C=O)—O—.

Furthermore, $R^{31}$ and $R^{32}$ are selected on each occurrence, identically or differently, from H, alkyl groups having 1 to 10 C atoms, alkoxy groups having 1 to 10 C atoms, thioalkoxy groups having 1 to 10 C atoms, alkenyl groups having 2 to 10 C atoms and alkenyloxy groups having 2 to 10 C atoms. $R^{31}$ and $R^{32}$ are particularly preferably alkyl groups having 1 to 10 C atoms.

Furthermore preferably, m is equal to 0 or 1 or 2.

Preferred embodiments of compounds of the formula (3), besides those shown above for compound (V), are the following:

CC-3-O1
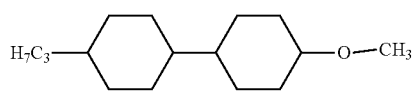

CC-3-O3
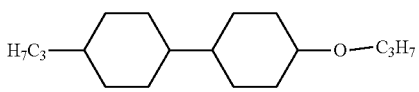

CC-5-O1
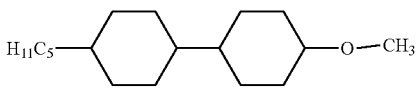

CC-5-O2
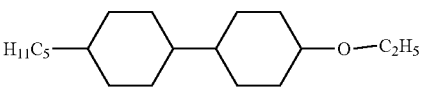

CC-2-3
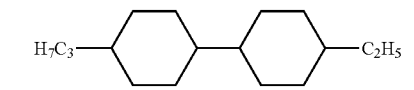

CC-3-4
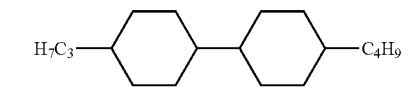

CP-3-O2
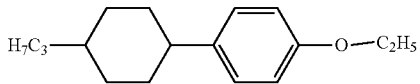

CCZC-3-3
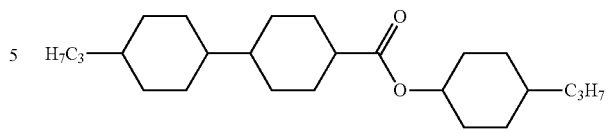

CCZC-3-5
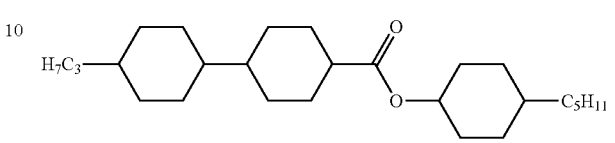

CCZC-4-3

CCZC-4-5
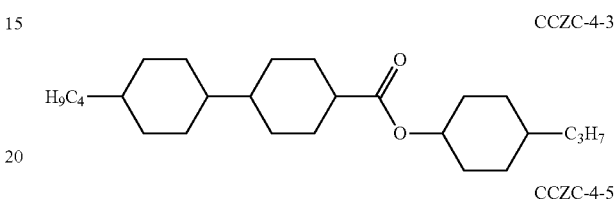

Preferred embodiments of the formula (3) conform to the formulae (3-A), (3-B) and (3-C), formula (3-A)
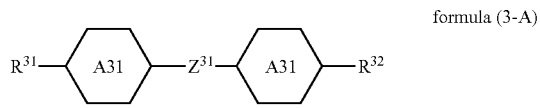

formula (3-B)
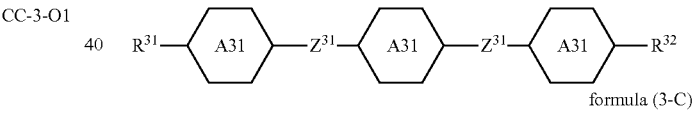

formula (3-C)
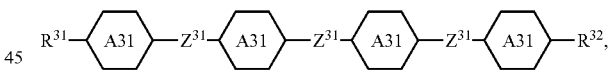

where the variables occurring are defined as for formula (3). The preferred embodiments mentioned for formula (3) apply correspondingly for the formulae (3-A), (3-B) and (3-C).

The mixture preferably comprises compounds of the formula (3-A) in a proportion of 10 to 40%, particularly preferably in a proportion of 12 to 30%, very particularly preferably in a proportion of 15 to 25%.

The mixture preferably comprises compounds of the formula (3-B) in a proportion of 0 to 20%, particularly preferably in a proportion of 2 to 15%, very particularly preferably in a proportion of 3 to 12%.

The mixture preferably comprises compounds of the formula (3-C) in a proportion of 0 to 15%, particularly preferably in a proportion of 1 to 10%, very particularly preferably in a proportion of 2 to 8%.

The mixture preferably comprises one or more compounds of the formula (3-1)

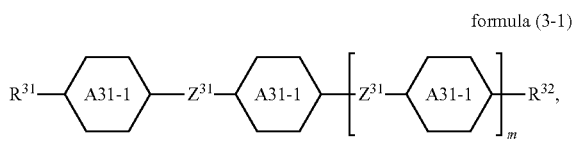

formula (3-1)

where the variables occurring are defined as for formula (3), and where the following applies:

$A^{31-1}$ are selected on each occurrence, identically or differently, from

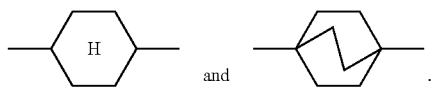

The preferred embodiments indicated above for formula (3) apply correspondingly for formula (3-1).

$A^{31-1}$ is preferably

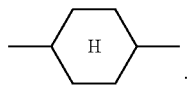

The mixture preferably comprises compounds of the formula (3-1) in a proportion of 5 to 50%, particularly preferably in a proportion of 10 to 40%, very particularly preferably in a proportion of 20 to 30%.

The mixture is furthermore preferably characterised in that it comprises less than 60%, preferably less than 50%, particularly preferably less than 40%, of compounds which contain one or more benzene rings.

The mixture is furthermore preferably characterised in that it comprises less than 20%, preferably less than 10%, particularly preferably essentially no compounds which contain two or more benzene rings.

The mixture is preferably used in combination with one or more dyes. Correspondingly, a mixture which, in addition to the components indicated above, comprises one or more dyes is preferred. The dyes are preferably organic compounds, particularly preferably organic compounds containing at least one condensed aryl or heteroaryl group.

The mixture preferably comprises at least two, particularly preferably at least three and very particularly preferably three or four different dyes. The at least two dyes preferably each cover different regions of the light spectrum.

If two or more dyes are present in the mixture, the absorption spectra of these dyes preferably complement one another in such a way that essentially the entire visible spectrum of light is absorbed. The impression of a black colour thus arises for the human eye. This is preferably achieved by using three or more different dyes, at least one of which absorbs blue light, at least one of which absorbs green to yellow light and at least one of which absorbs red light. Light colour here is defined in accordance with B. Bahadur, Liquid Crystals—Applications and Uses, Vol. 3, 1992, World Scientific Publishing, section 11.2.1.

The total proportion of the dyes in the mixture is preferably 0.01 to 20%, particularly preferably 0.1 to 15% and very particularly preferably 0.2 to 12%. The proportion of each individual one of the one or more dyes is preferably 0.01 to 15%, preferably 0.05 to 12% and very particularly preferably 0.1 to 10%.

The dye present in the mixture is preferably dissolved in the mixture. The dye is preferably influenced in its alignment by the alignment of the molecules of the mixture in the liquid-crystalline state.

The dye is preferably a dichroic dye, particularly preferably a positively dichroic dye. Positively dichroic is taken to mean that the dye has a positive degree of anisotropy R. The degree of anisotropy R is particularly preferably greater than 0.4, very particularly preferably greater than 0.5 and most preferably greater than 0.6. The degree of anisotropy R is determined as indicated in the working examples of the application text WO2015/154848.

In an alternative embodiment, it may also be preferred for the dye to be a negatively dichroic dye. Negatively dichroic is taken to mean that the dye has a negative degree of anisotropy R.

The dyes present in the mixture are preferably either all positively dichroic, or all negatively dichroic.

Furthermore preferably, the dye in accordance with the present application absorbs predominantly light in the UV-VIS-NIR region, i.e. in a wavelength range from 320 to 1500 nm. The dye particularly preferably absorbs predominantly light in the VIS region, i.e. in a wavelength range from 380 to 780 nm.

The dye particularly preferably has one or more absorption maxima in the UV-VIS-NIR region defined above, preferably in the VIS region, i.e. a wavelength of 380 nm to 780 nm. For applications in switchable windows, it may likewise be preferred for the dye to have one or more absorption maxima in the NIR region, in particular between 780 nm and 1500 nm.

The dye is furthermore preferably selected from the dye classes indicated in B. Bahadur, Liquid Crystals—Applications and Uses, Vol. 3, 1992, World Scientific Publishing, section 11.2.1, and particularly preferably from the explicit compounds shown in the table.

The dye is preferably selected from azo compounds, anthraquinones, methine compounds, azomethine compounds, merocyanine compounds, naphthoquinones, tetrazines, rylenes, in particular perylenes and terylenes, benzothiadiazoles, pyrromethenes and diketopyrrolopyrroles. Of these, particular preference is given to azo compounds, anthraquinones, benzothiadiazoles, in particular as disclosed in WO 2014/187529, diketopyrrolopyrroles, in particular as disclosed in WO 2015/090497, and rylenes, in particular as disclosed in WO 2014/090373.

The following compounds are examples of the said dyes:
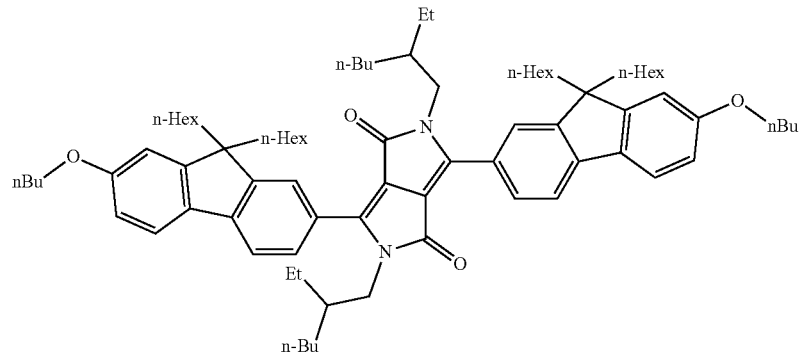
1
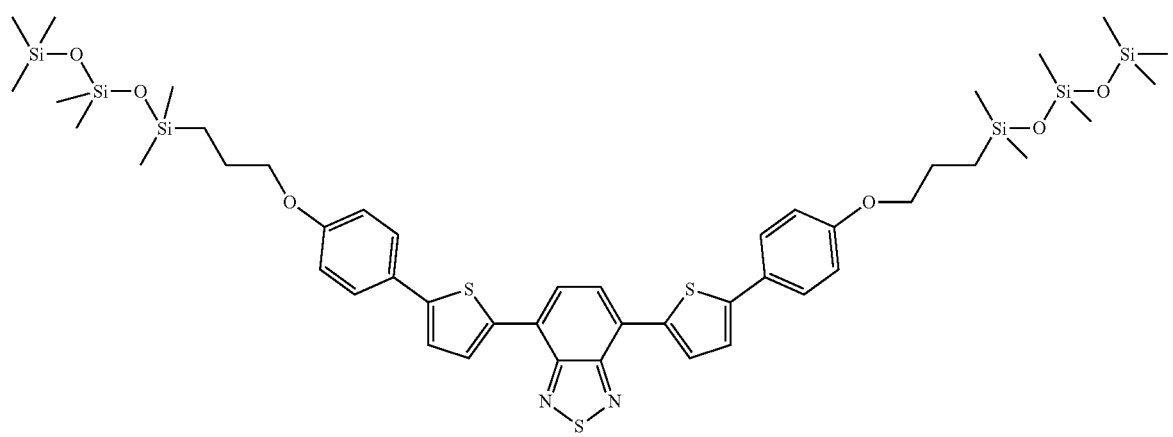
2
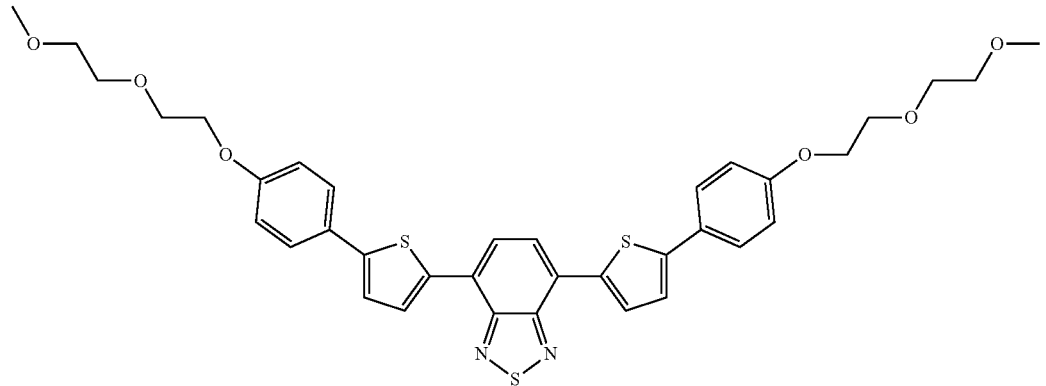
3
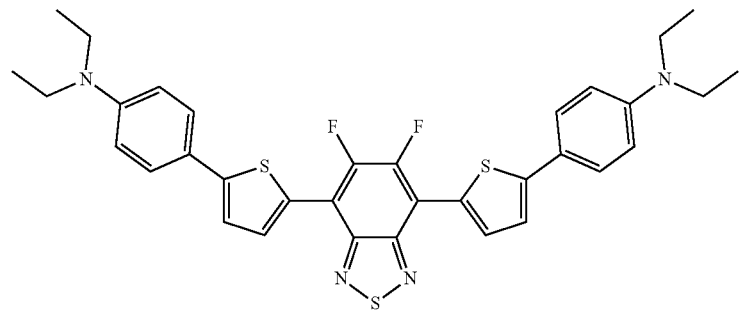
4

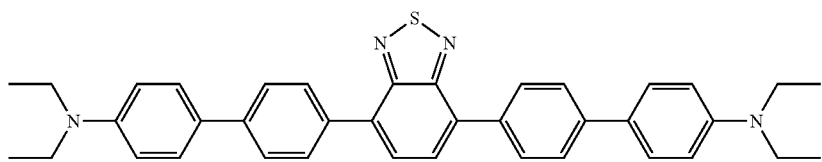
5
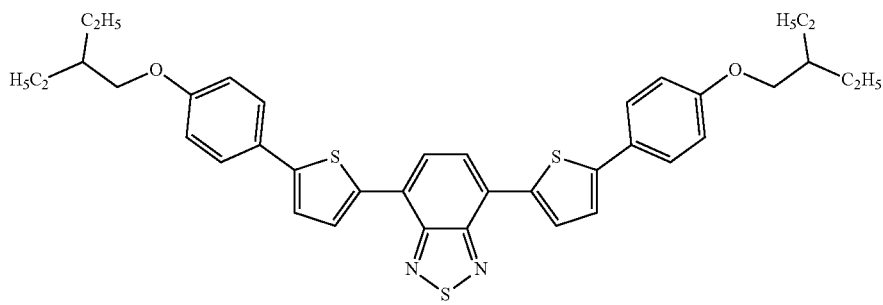
6
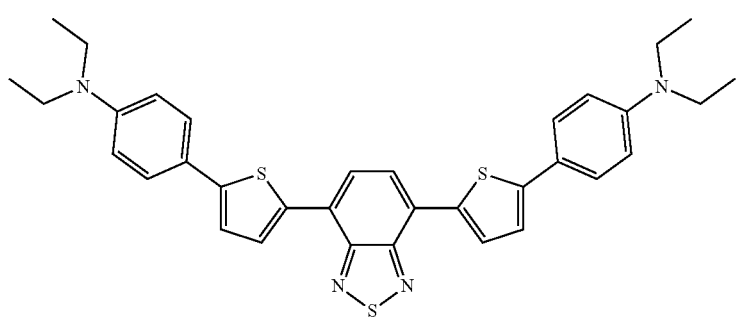
7
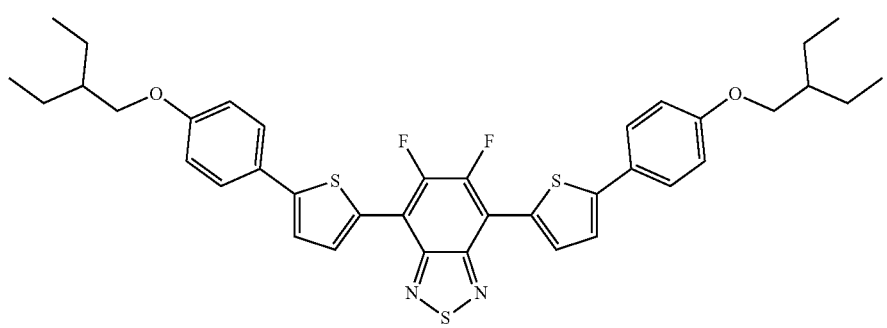
8
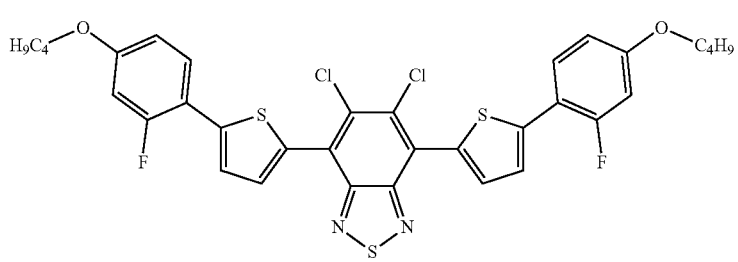
9
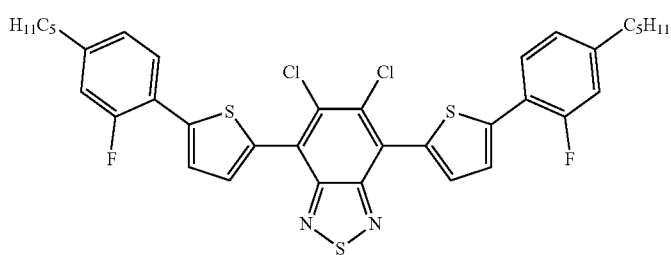
10

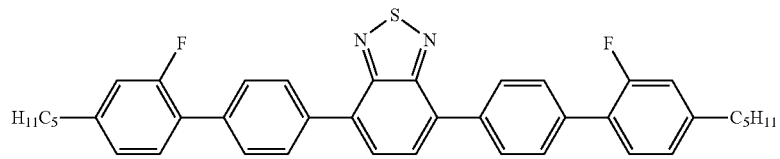
11
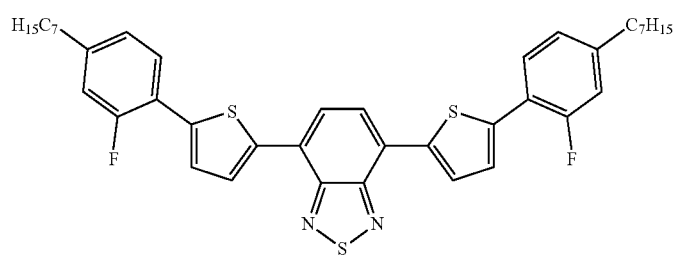
12
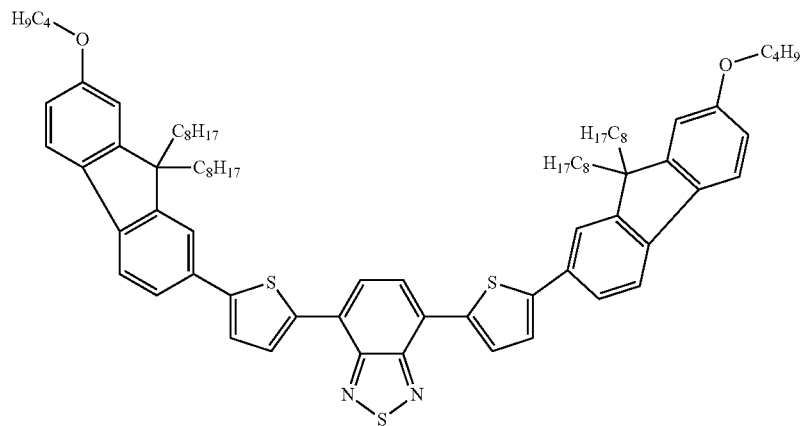
13
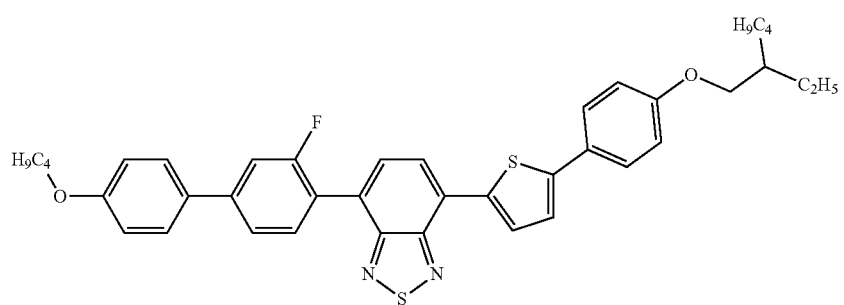
14
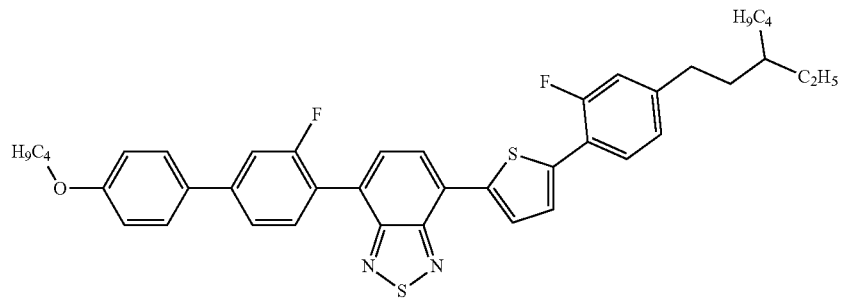
15

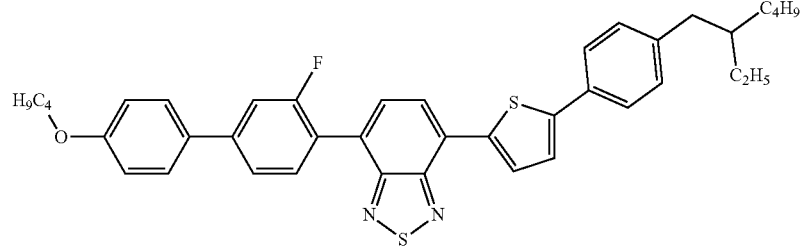
16
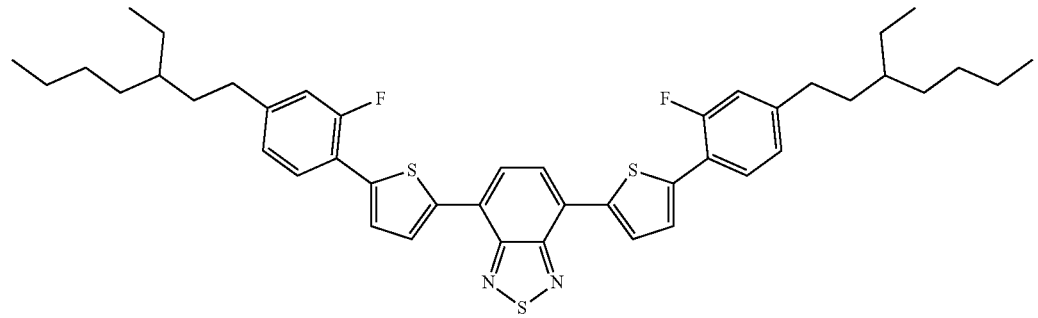
17
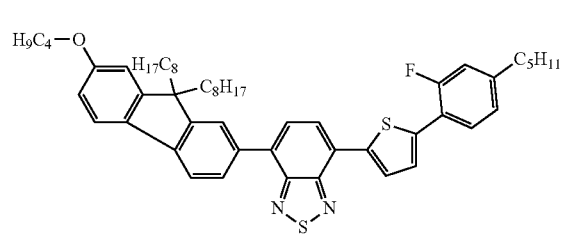
18
19
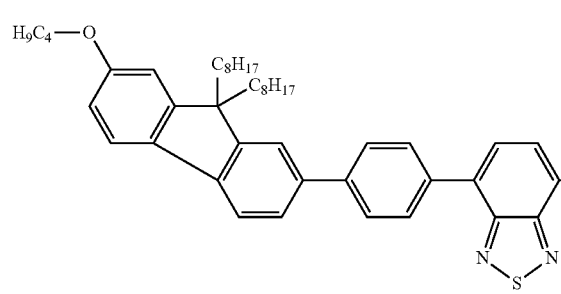
20
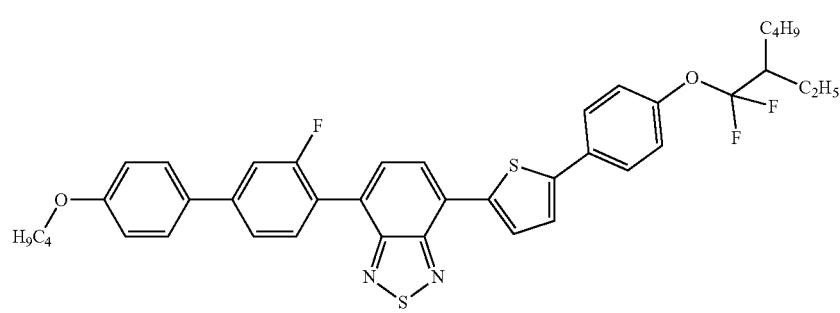
21

22
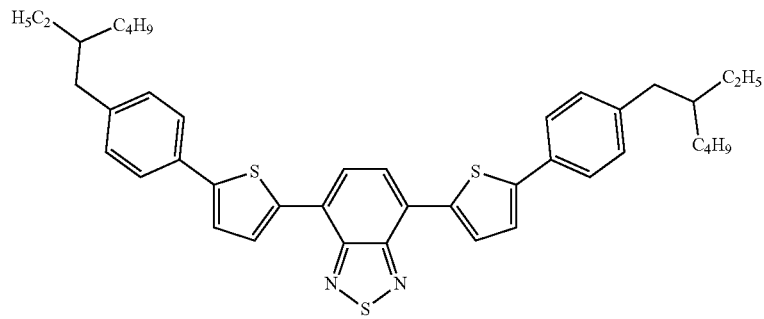
23
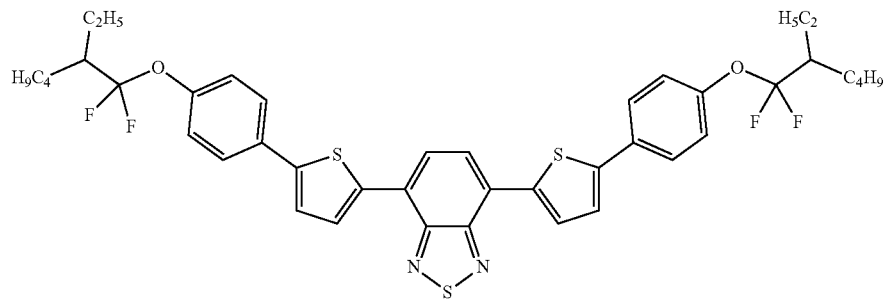
24
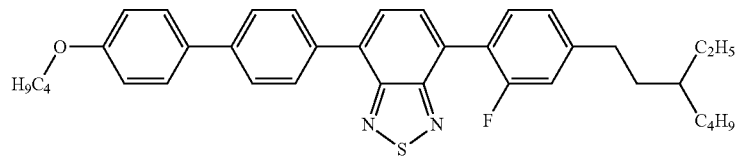
25
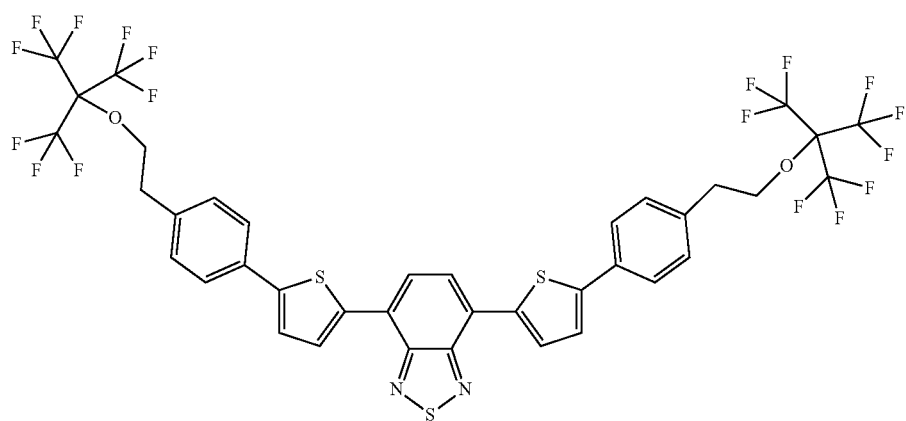
26
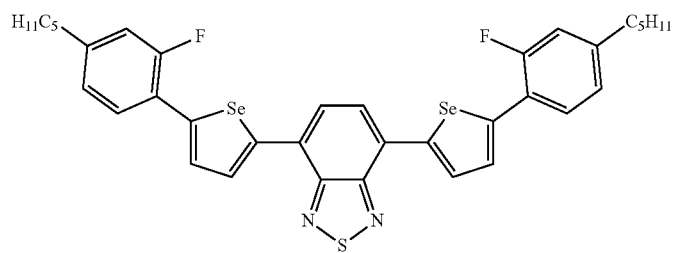

-continued
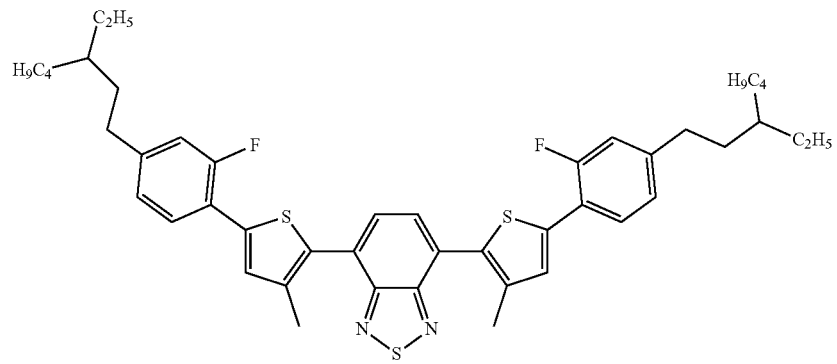
27
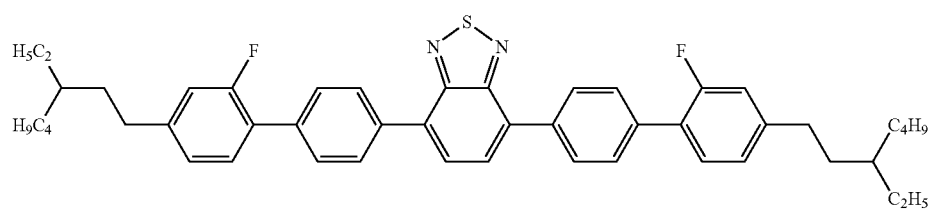
28
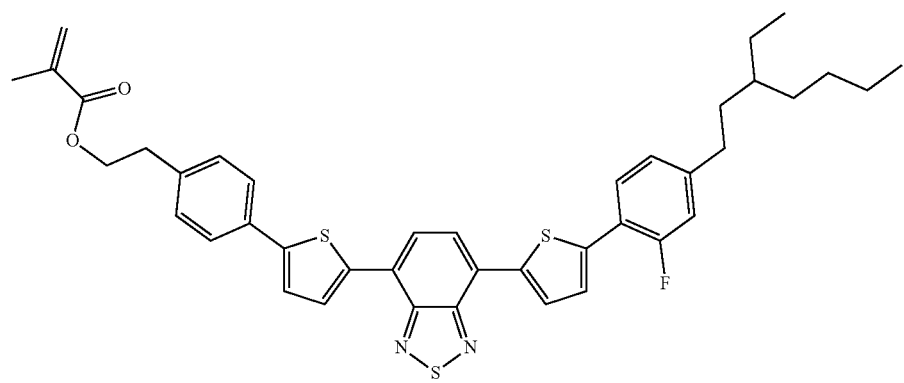
29
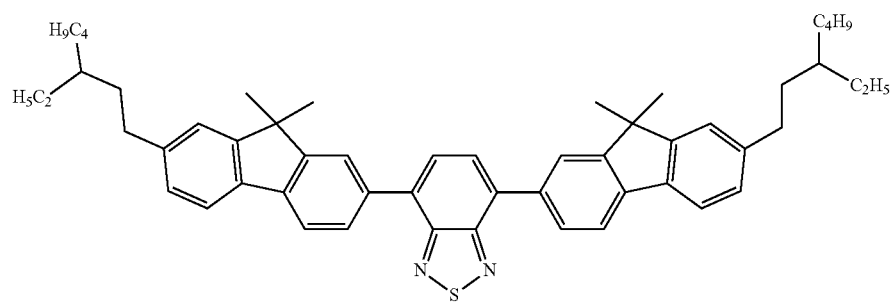
30
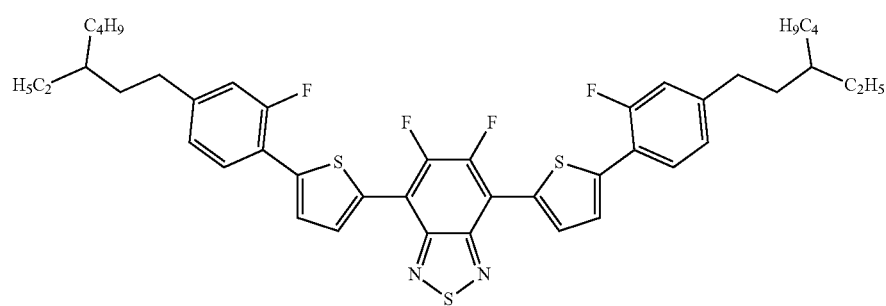
31

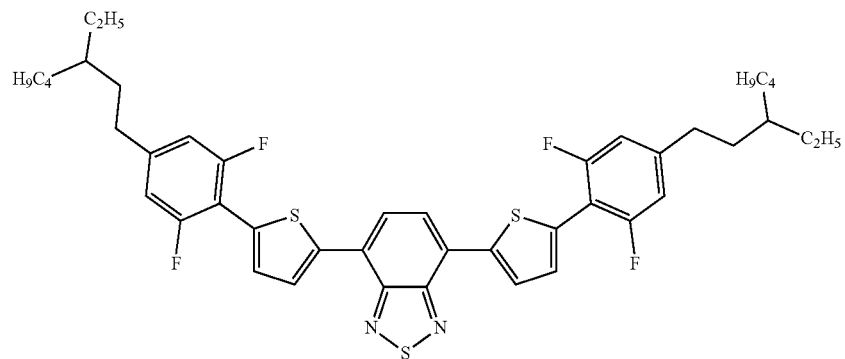
32
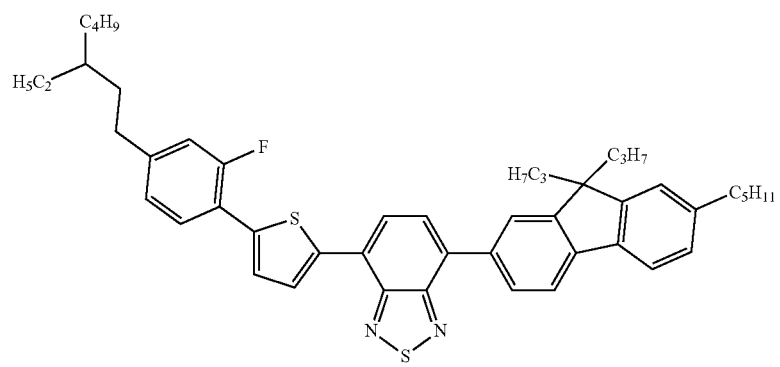
33
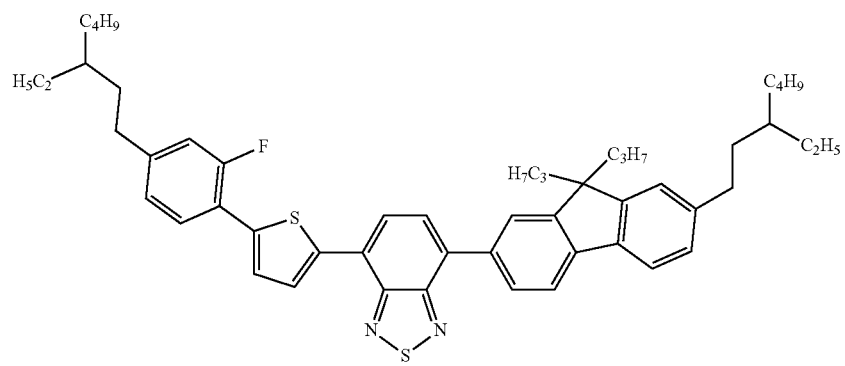
34
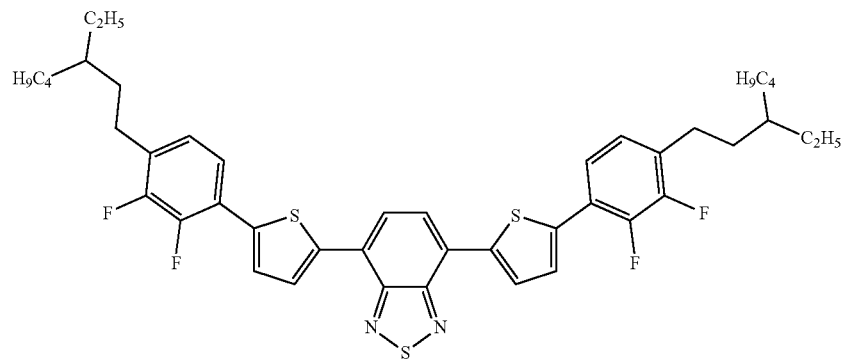
35

-continued
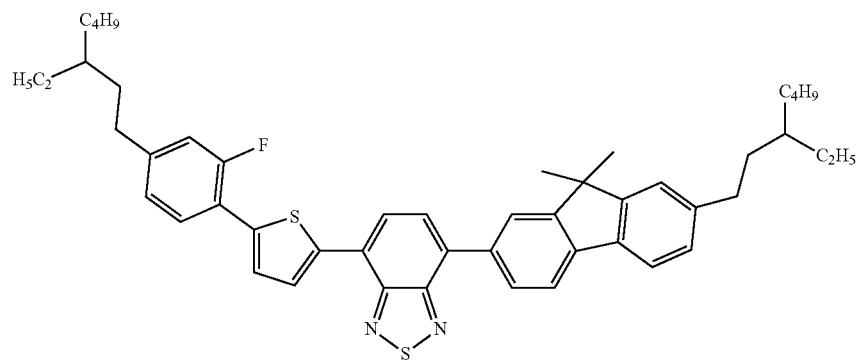
36
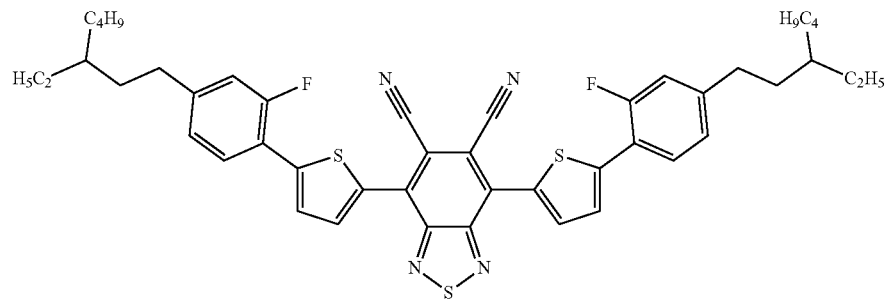
37
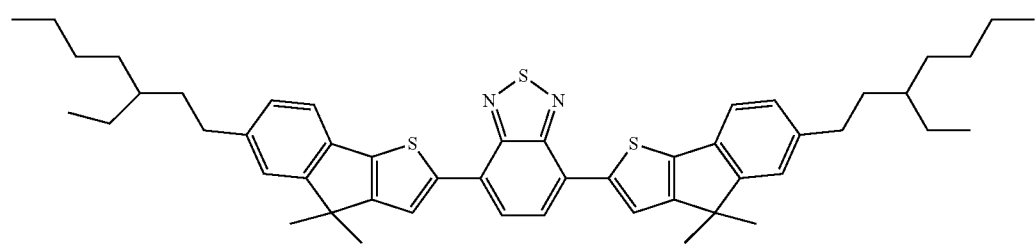
38
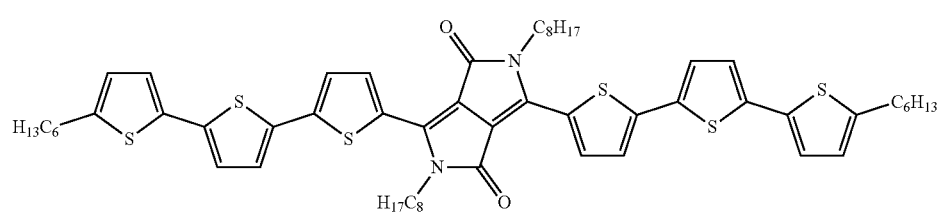
39
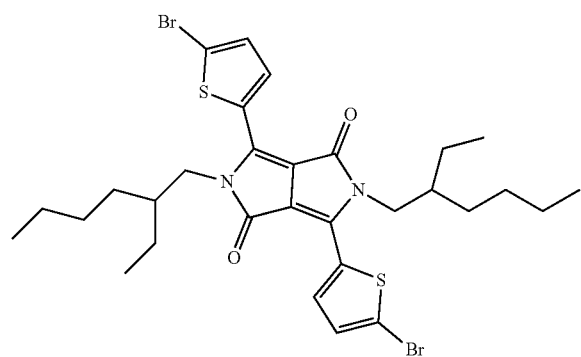
40

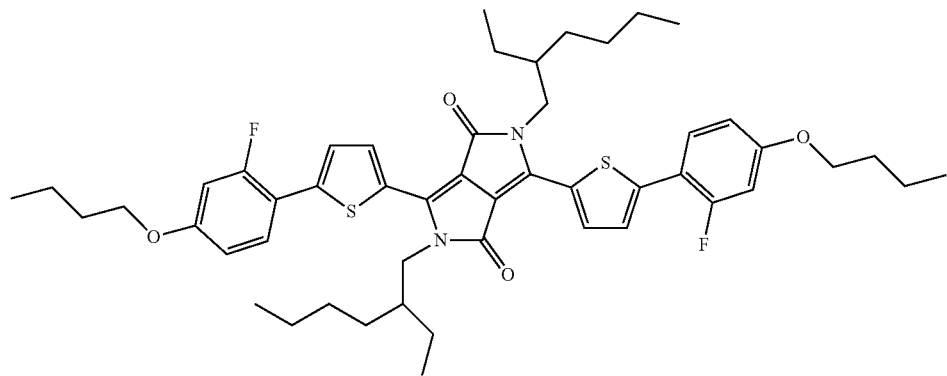
41
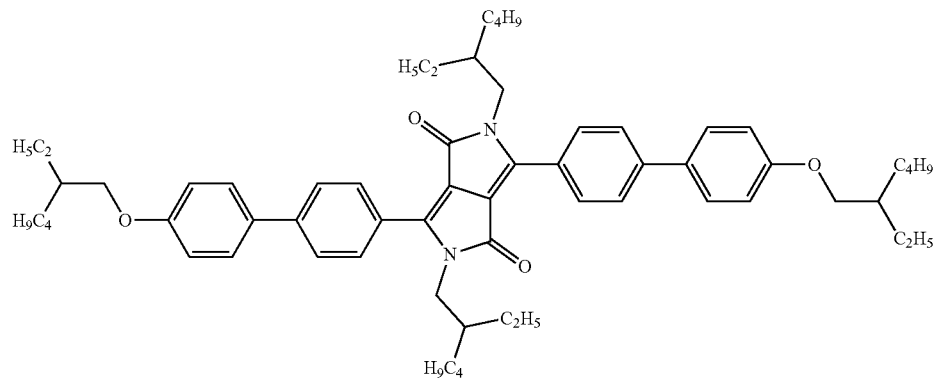
42
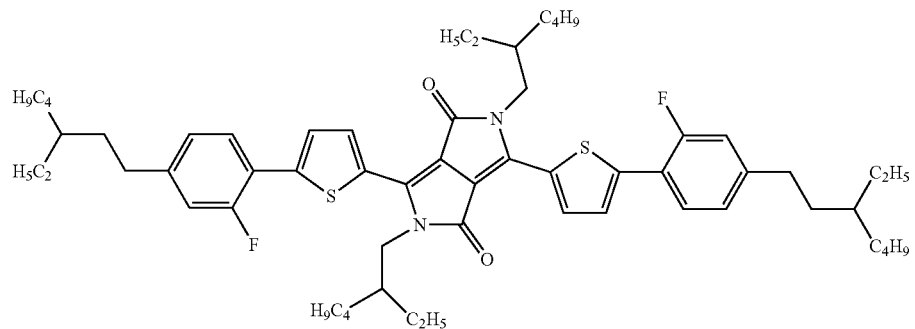
43
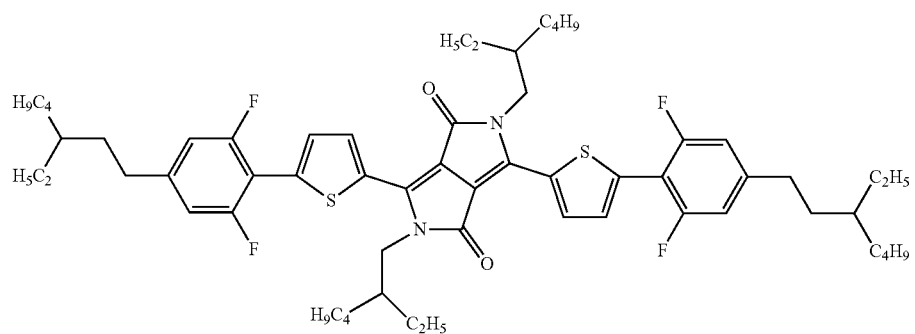
44

-continued
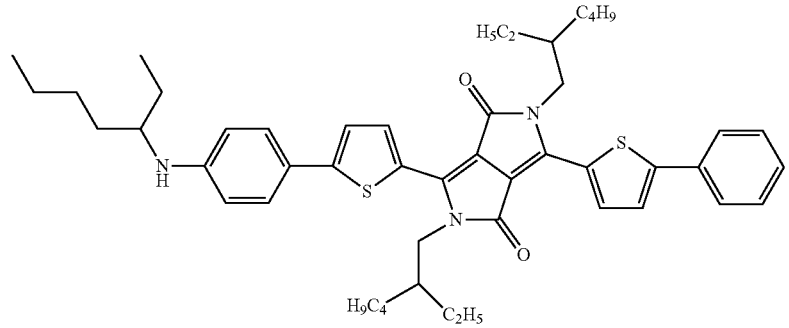
45
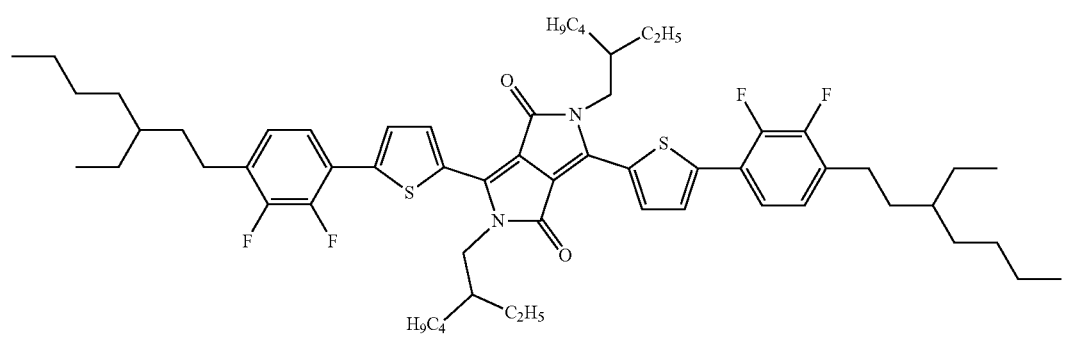
46
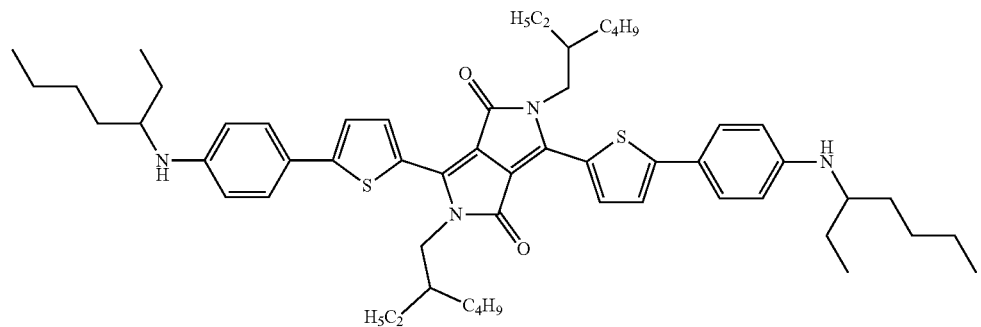
47
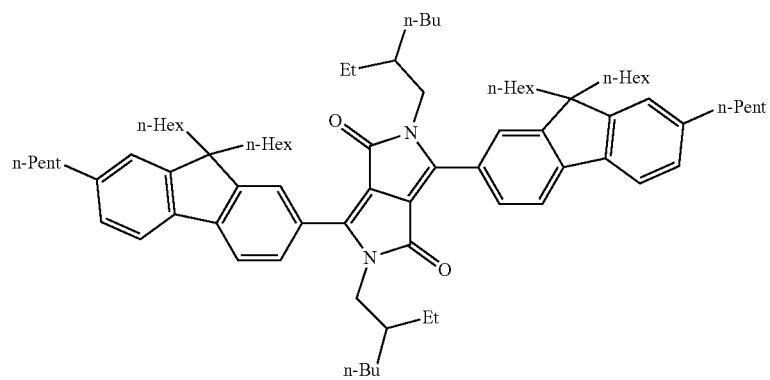
48

49
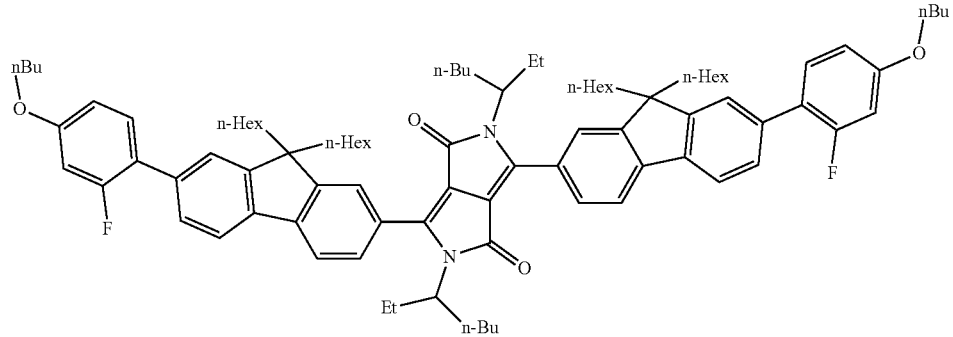
50
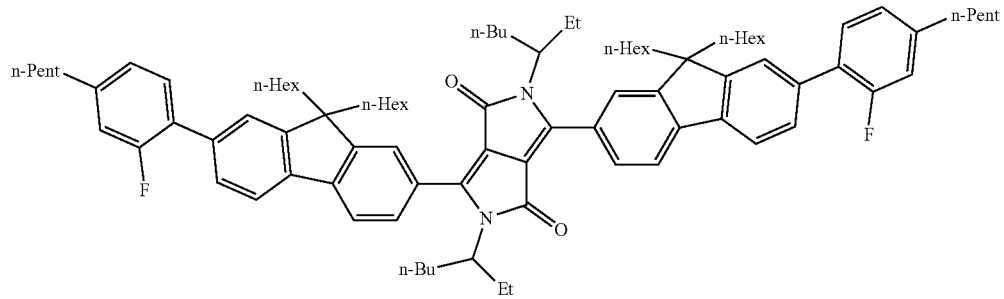
51
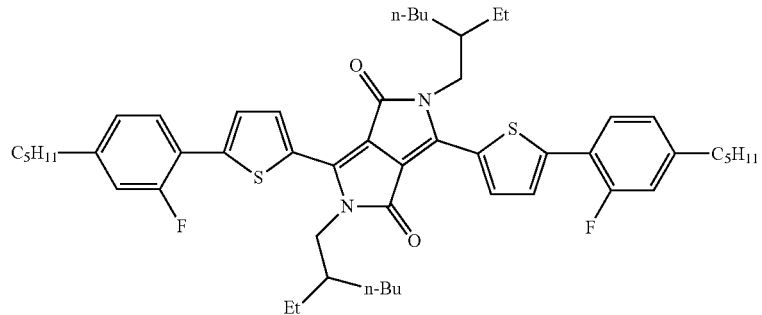
52
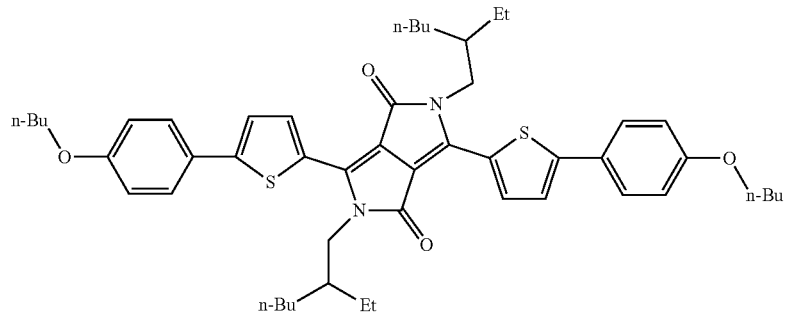
53
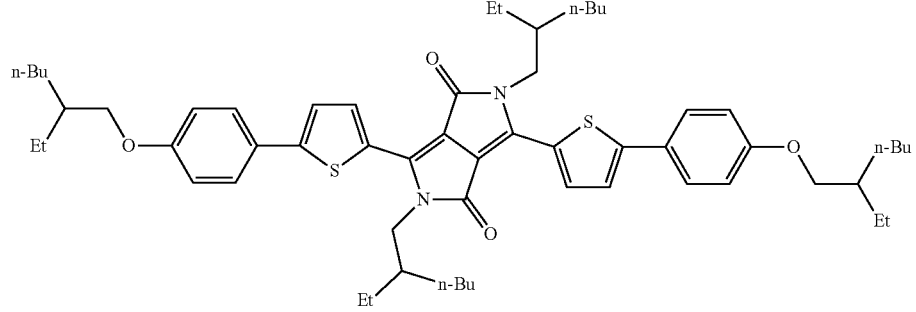

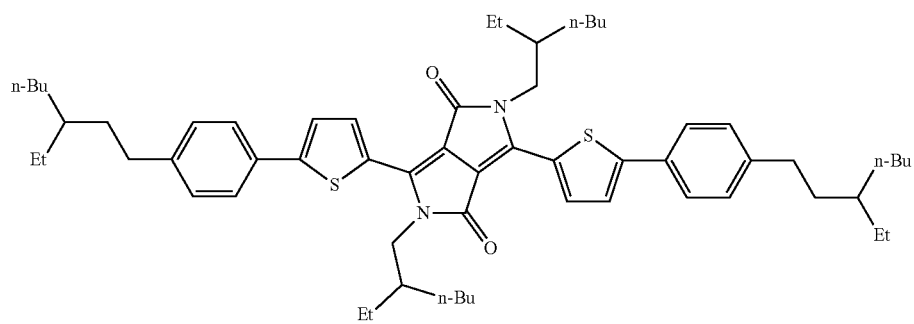
54
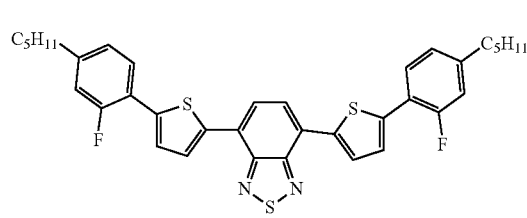
55
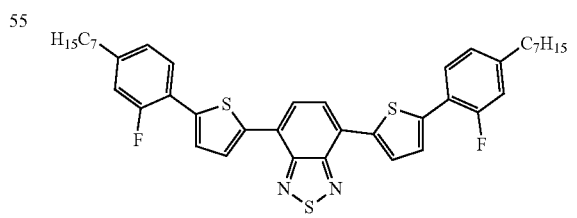
56
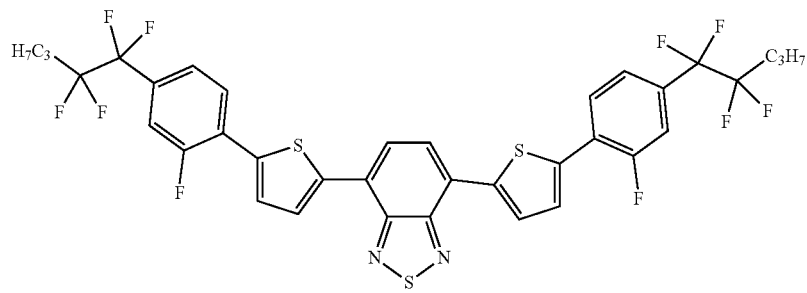
57
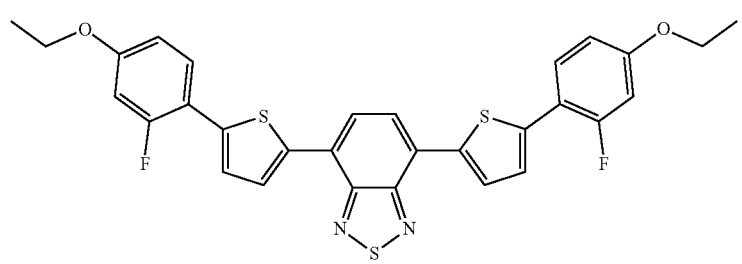
58
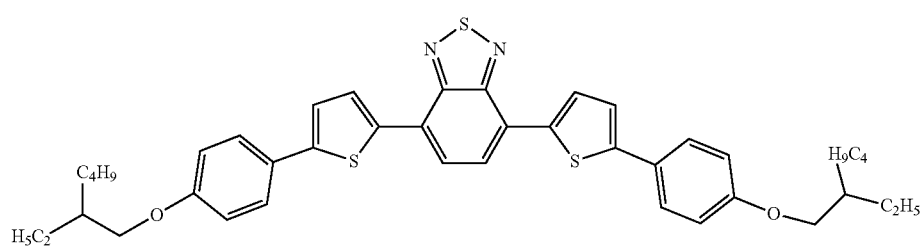
59
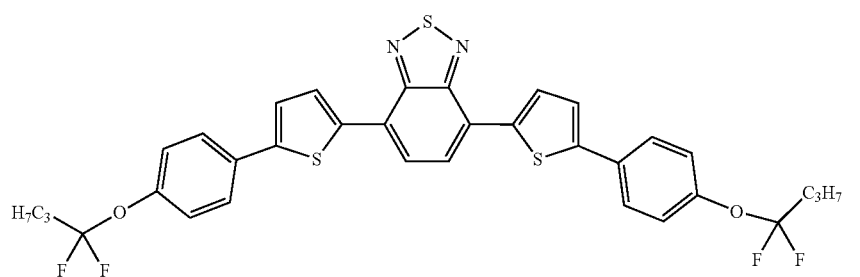
60

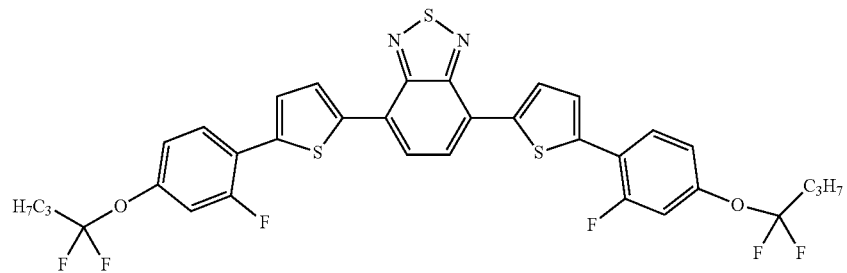
61
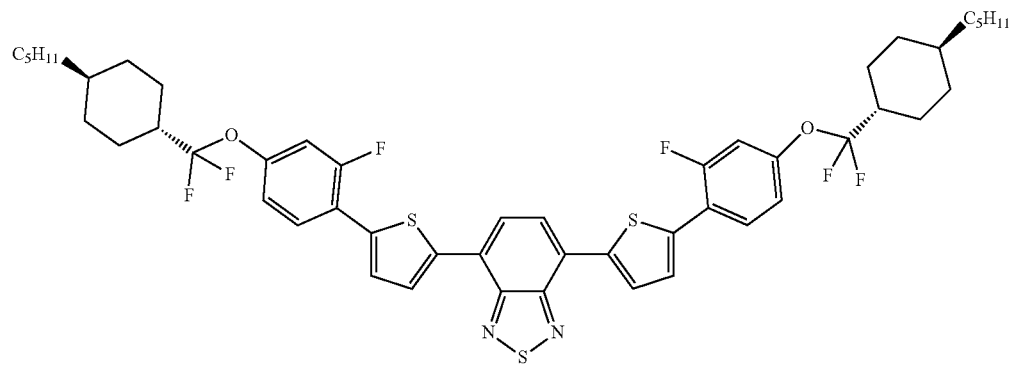
62
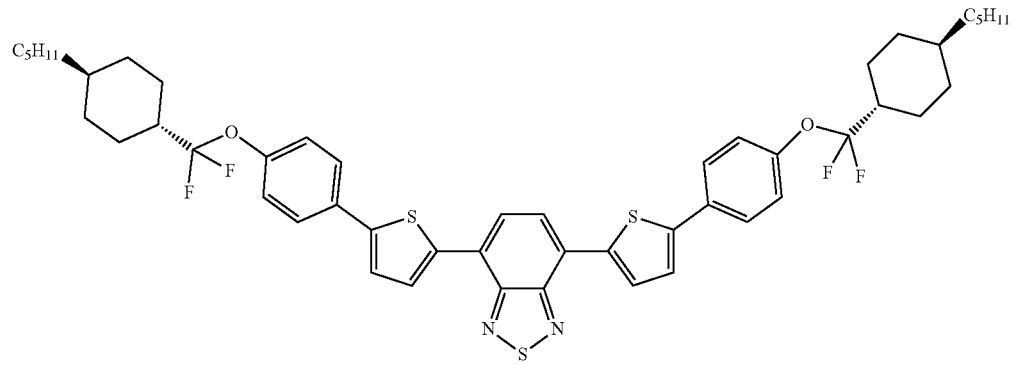
63
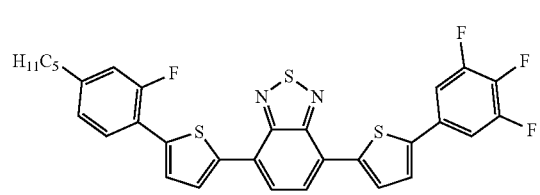
64
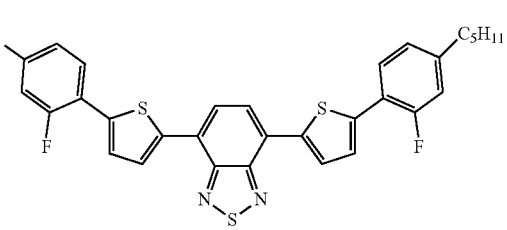
65
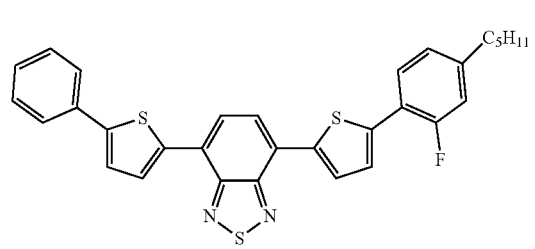
66
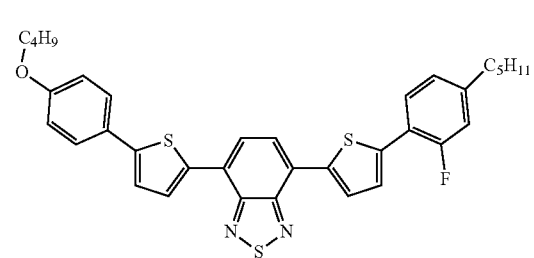
67

-continued
68
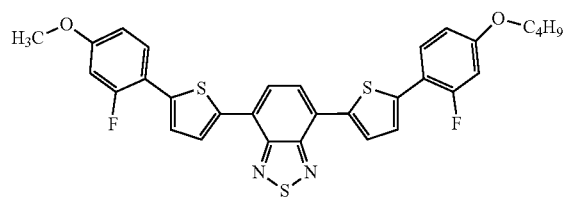
69
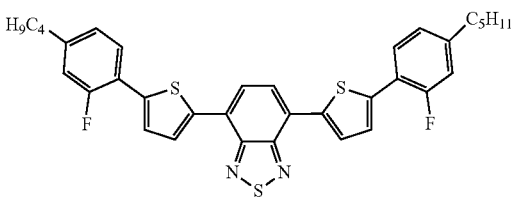
70
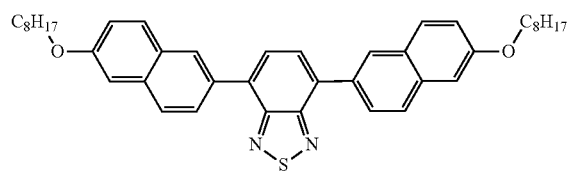
71
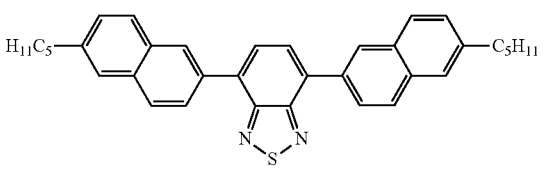
72
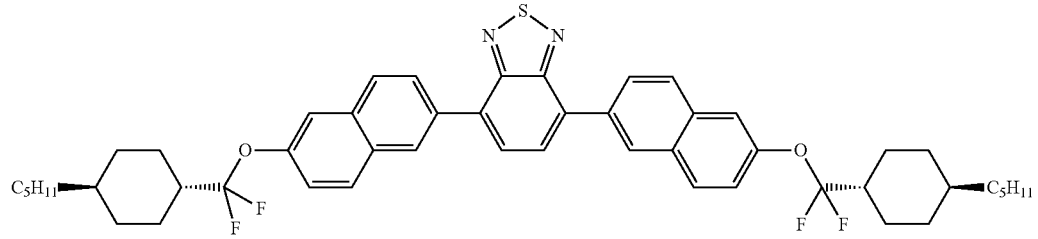
73
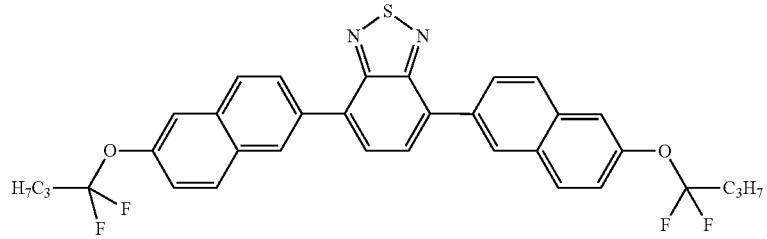
74
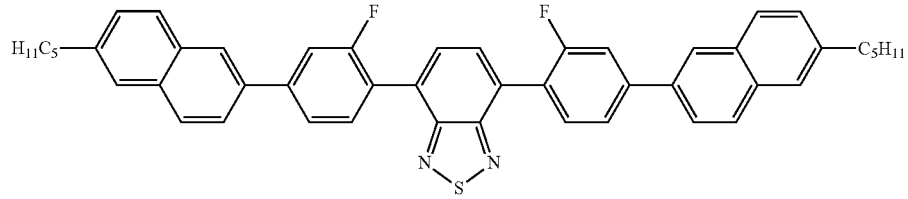
75
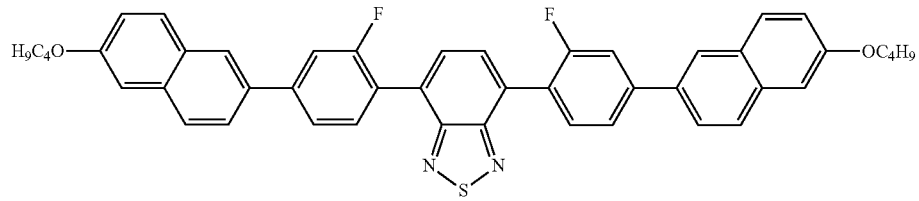
76
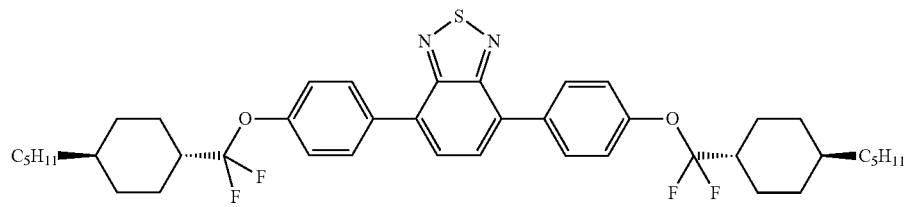

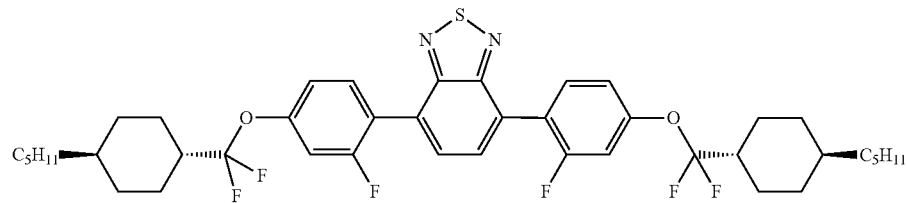
77
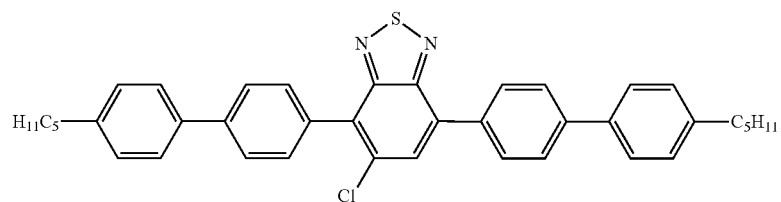
78
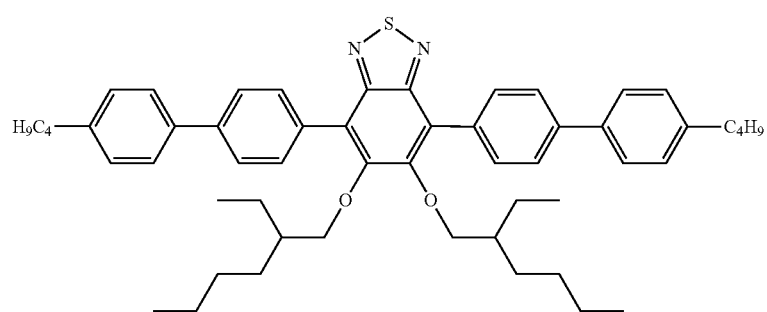
79
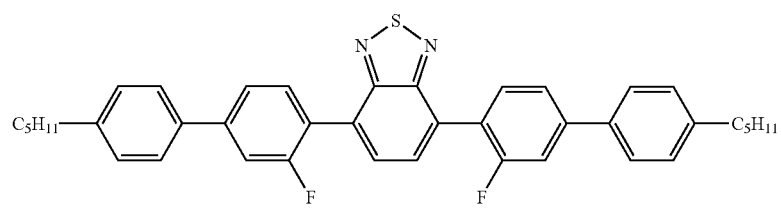
80
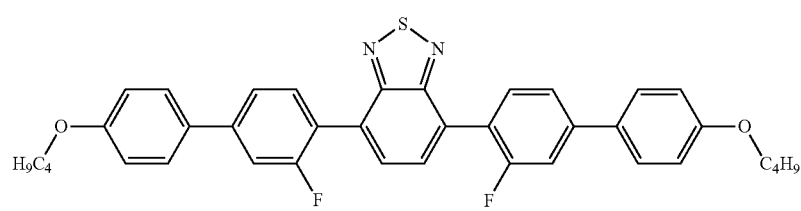
81
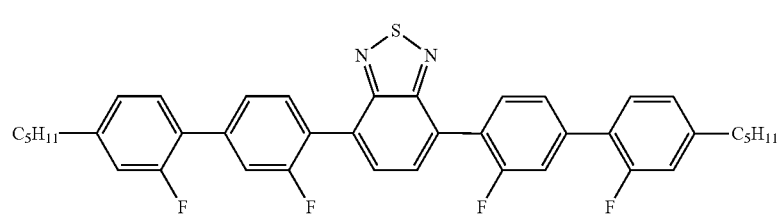
82
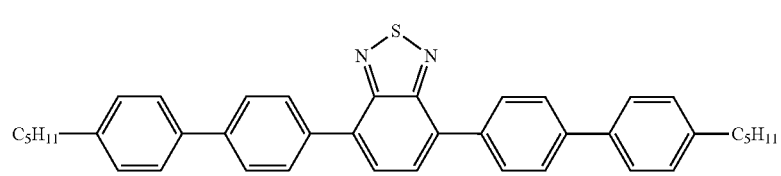
83

-continued
84
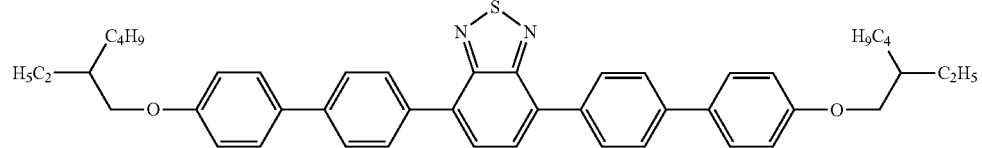
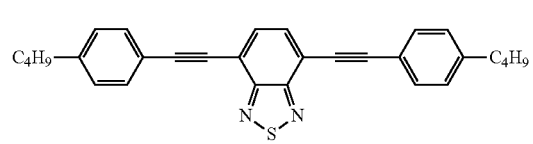
85
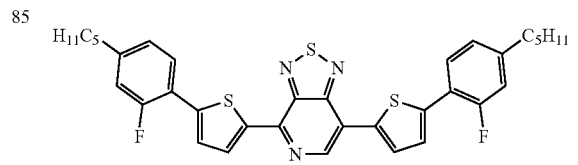
86
87
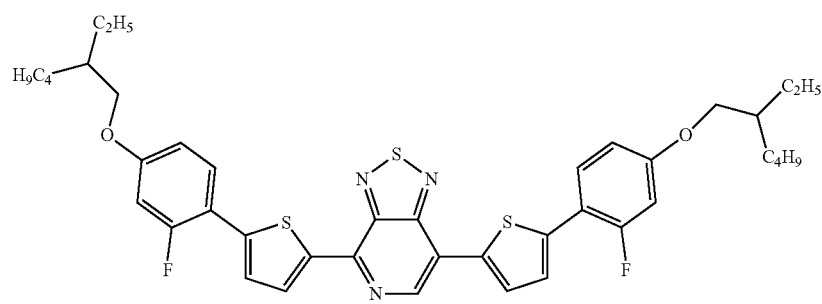
88
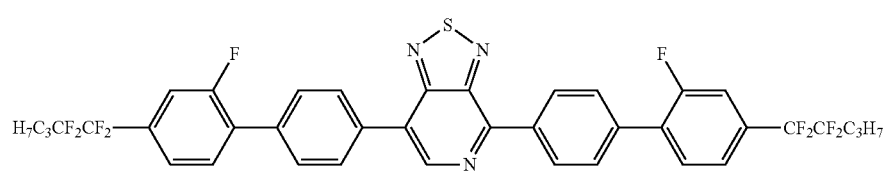
89
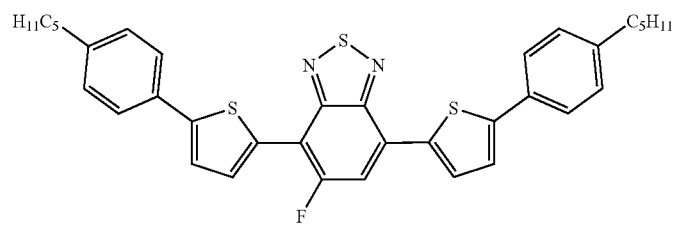
90
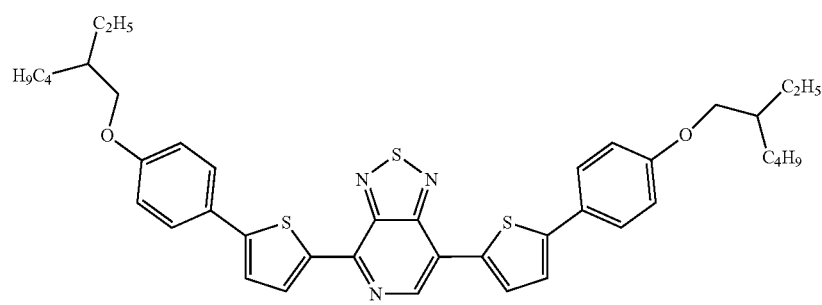
91
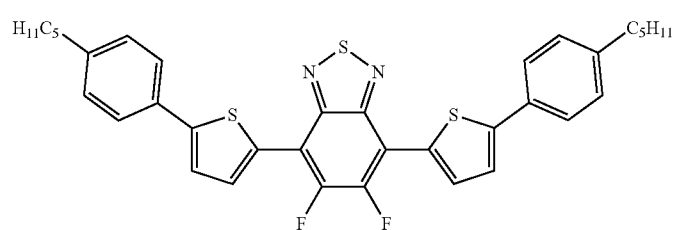

-continued
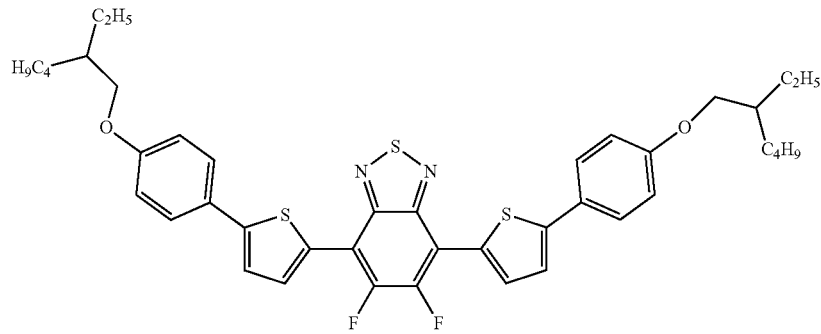
92
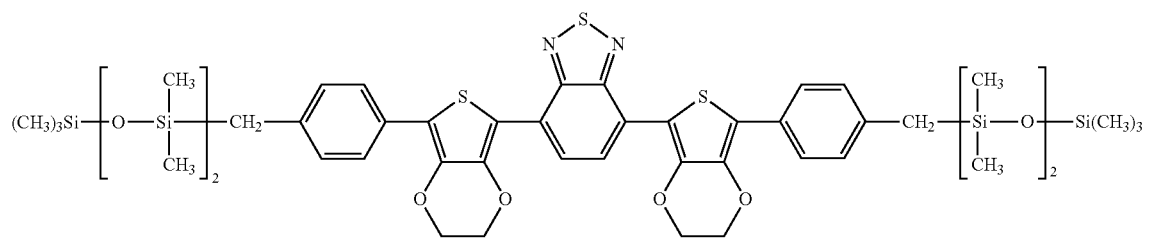
93
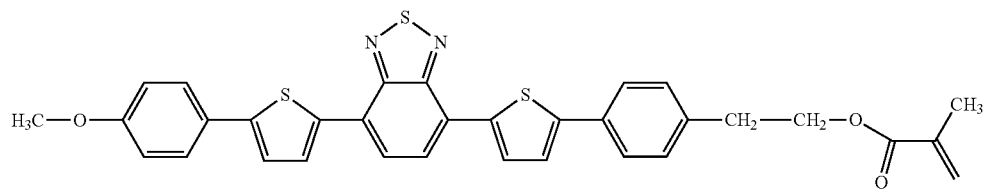
94
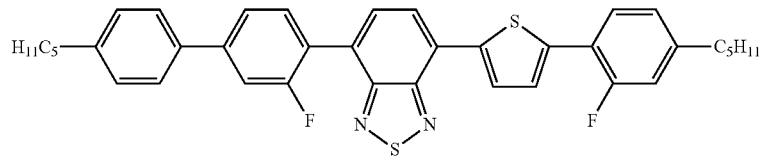
95
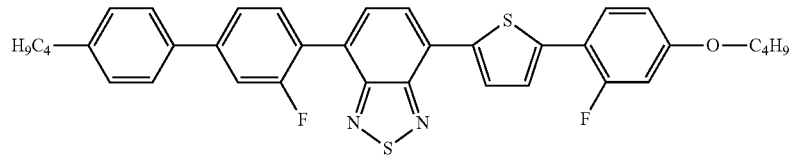
96
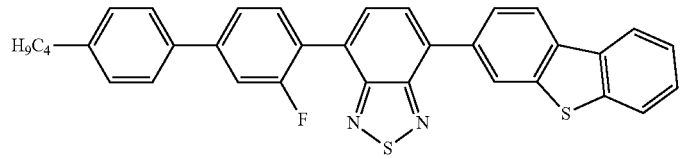
97
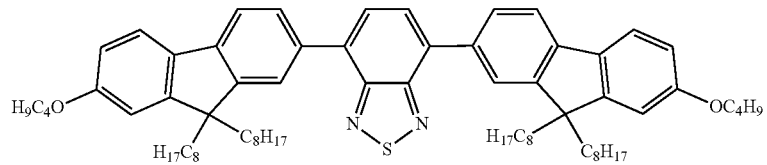
98
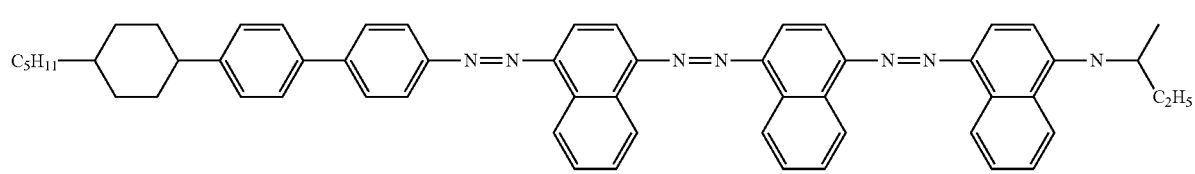
99

-continued

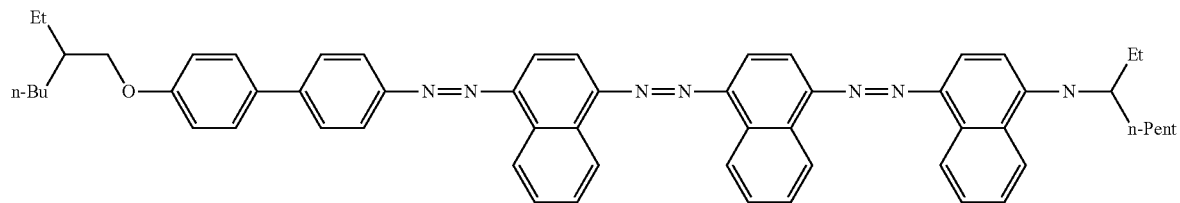

100

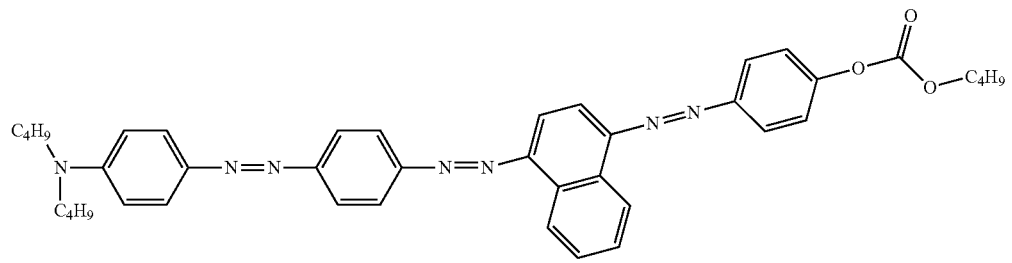

101

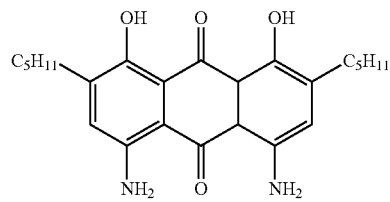

102

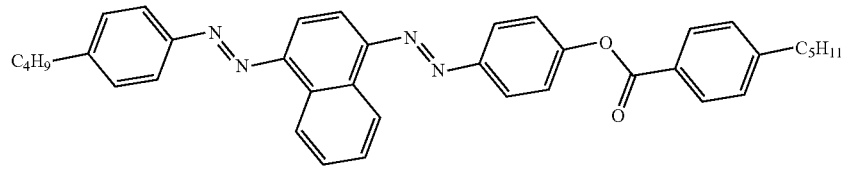

103

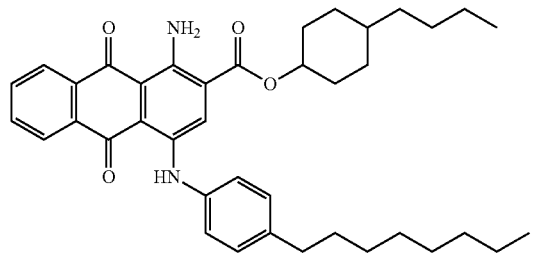

104

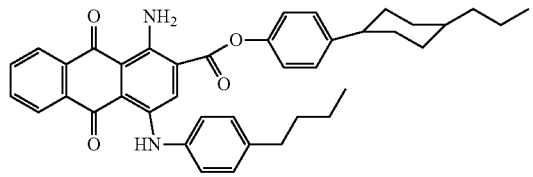

105

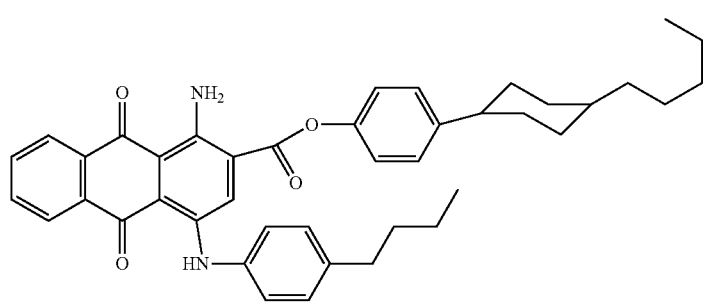

106

The mixture preferably comprises one or more chiral dopants. In this case, the molecules of the mixture in the liquid-crystalline state are preferably twisted with respect to one another in the layer of a device which contains the mixture, particularly preferably as known from the TN mode or STN mode (twisted nematic mode or supertwisted nematic mode) of display devices.

Chiral dopants are preferably employed in the mixture in a total concentration of 0.01% by weight to 3% by weight, particularly preferably from 0.05% by weight to 1% by weight. In order to obtain high values for the twist, the total concentration of the chiral dopants may also be selected higher than 3% by weight, preferably up to a maximum of 10% by weight.

Preferred dopants are the compounds depicted in the following table:
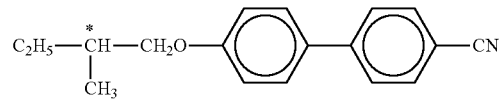
DP-1
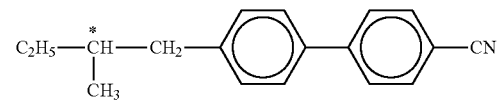
DP-2
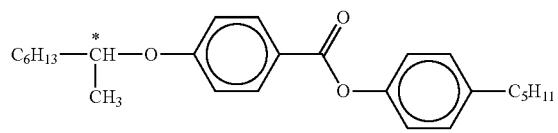
DP-3
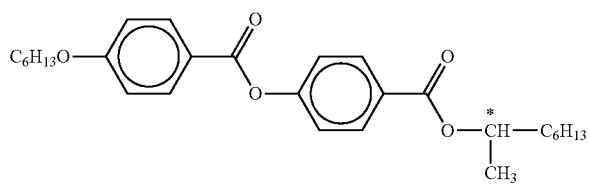
DP-4
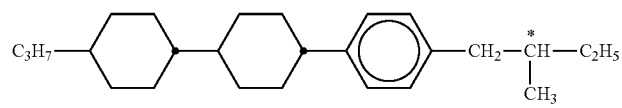
DP-5
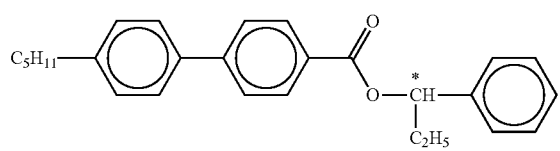
DP-6
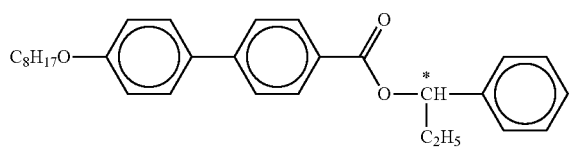
DP-7
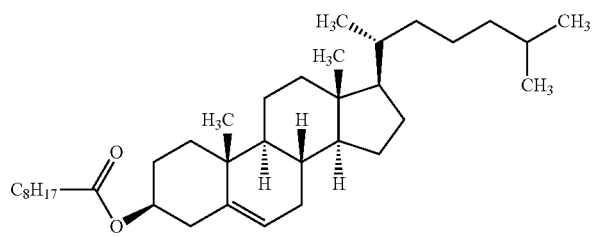
DP-8

-continued
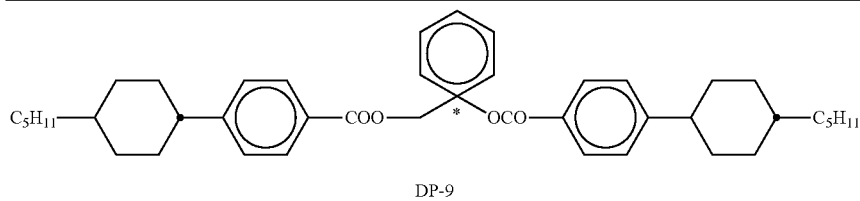
DP-9
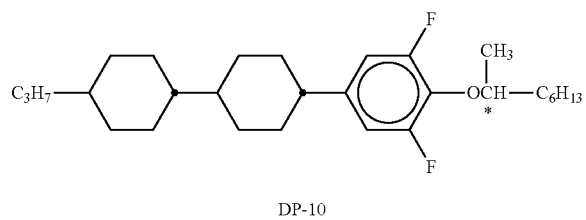
DP-10
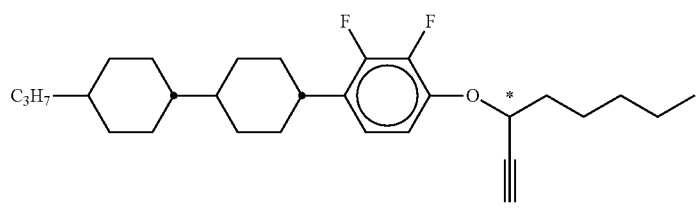
DP-11
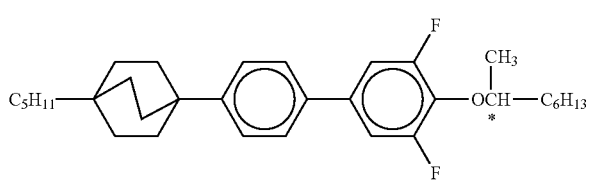
DP-12
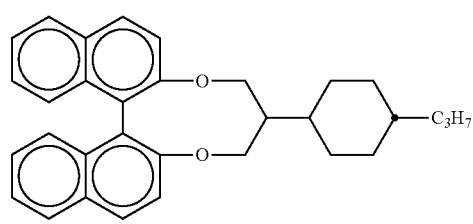
DP-13
The mixture furthermore preferably comprises one or more stabilisers. The total concentration of the stabilisers is preferably between 0.00001% by weight and 10% by weight, particularly preferably between 0.0001% by weight and 1% weight of the entire mixture.
Preferred stabilisers are shown in the following table:
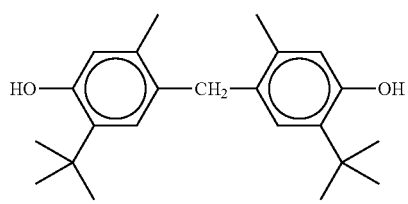
ST-1

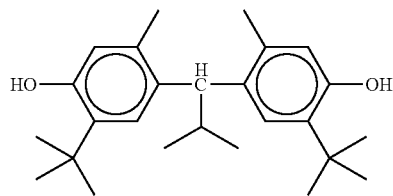
ST-2
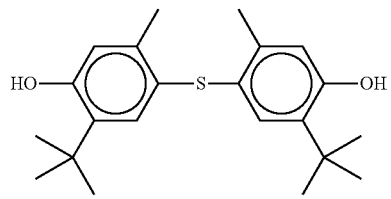
ST-3
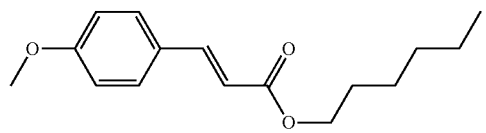 [SMILES: CCCCCCOC(=O)/C=C/c1ccc(OC)cc1]
ST-4
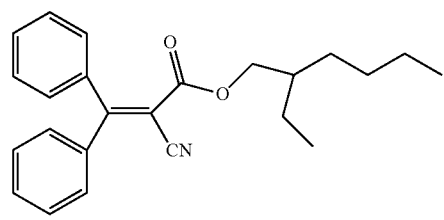 [SMILES: CCCCC(CC)COC(=O)C(C#N)=C(c1ccccc1)c1ccccc1]
ST-5
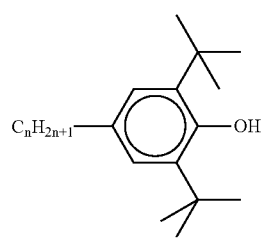
ST-6
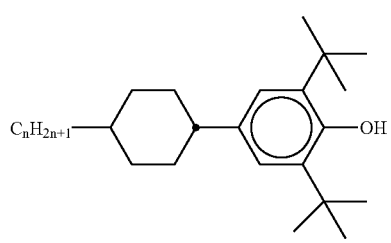
ST-7

-continued
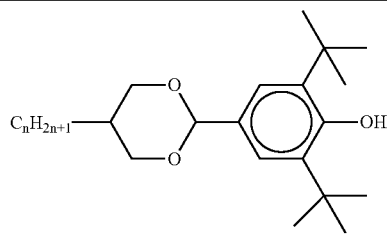
ST-8
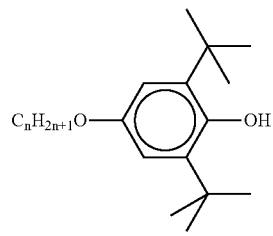
ST-9
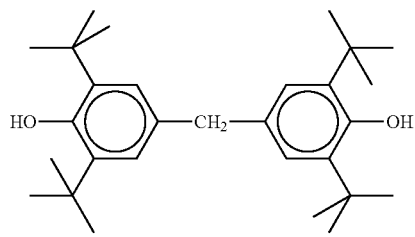
ST-10
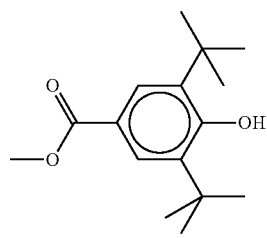
ST-11
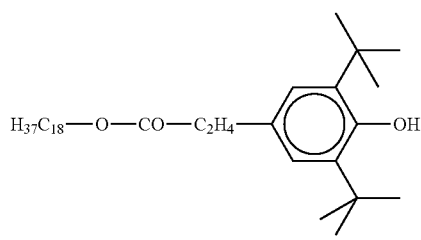
ST-12
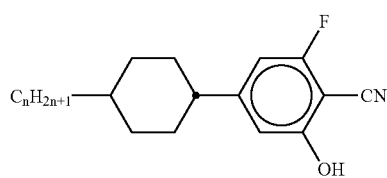
ST-13

-continued
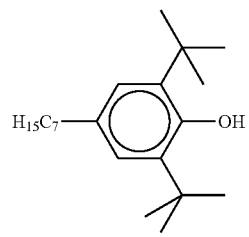
ST-14
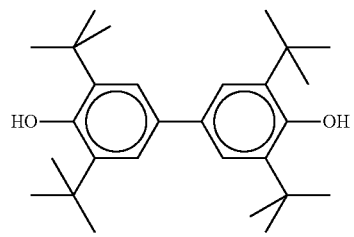
ST-15
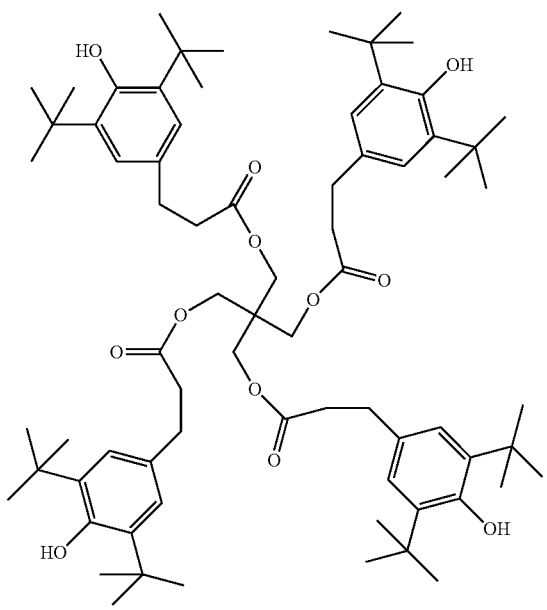 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
ST-16
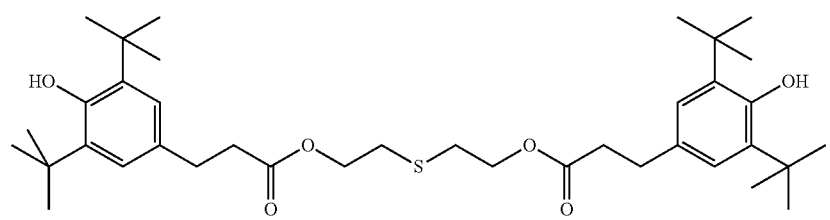 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
ST-17

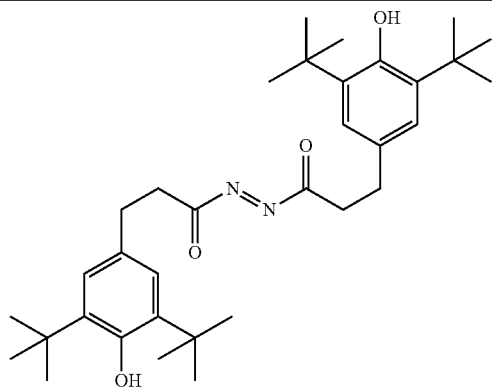
ST-18
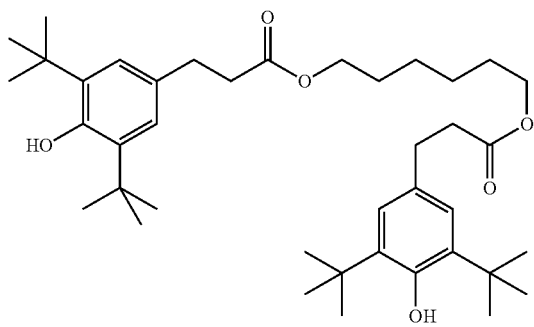 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
ST-19
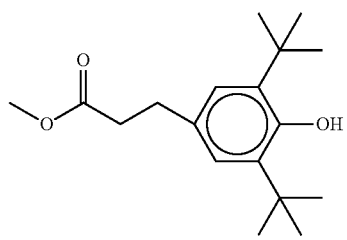
ST-20
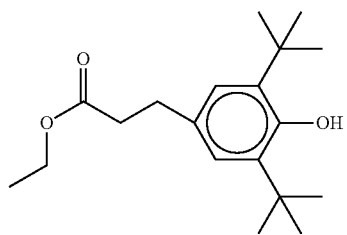
ST-21
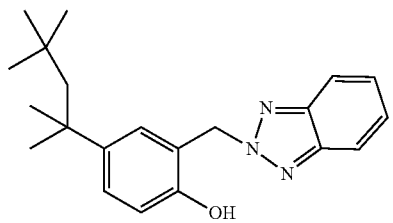 [SMILES: CC(C)(C)CC(C)(C)c1ccc(O)c(Cn2nc3ccccc3n2)c1]
ST-22

-continued
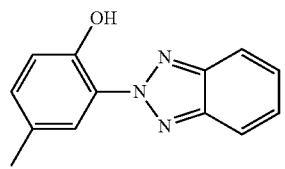 [SMILES: Cc1ccc(O)c(-n2nc3ccccc3n2)c1]
ST-23
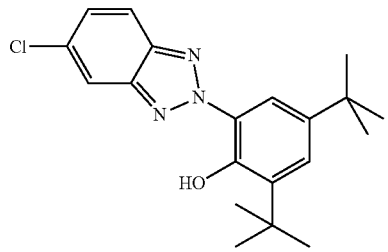 [SMILES: CC(C)(C)c1cc(-n2nc3ccc(Cl)cc3n2)c(O)c(C(C)(C)C)c1]
ST-24
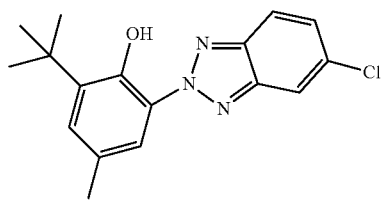 [SMILES: Cc1cc(-n2nc3ccc(Cl)cc3n2)c(O)c(C(C)(C)C)c1]
ST-25
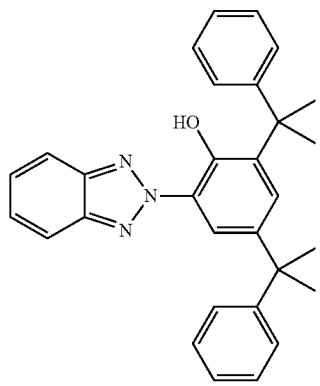 [SMILES: CC(C)(c1ccccc1)c1cc(-n2nc3ccccc3n2)c(O)c(C(C)(C)c2ccccc2)c1]
ST-26
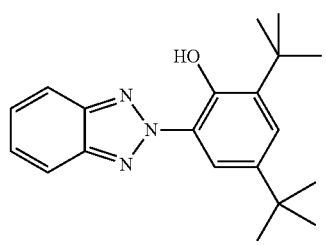 [SMILES: CC(C)(C)c1cc(-n2nc3ccccc3n2)c(O)c(C(C)(C)C)c1]
ST-27

-continued
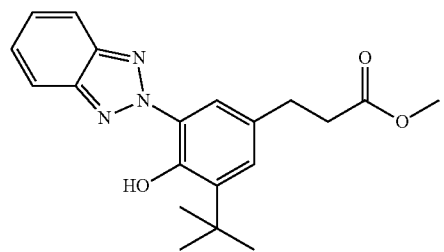 [SMILES: COC(=O)CCc1cc(-n2nc3ccccc3n2)c(O)c(C(C)(C)C)c1]
ST-28
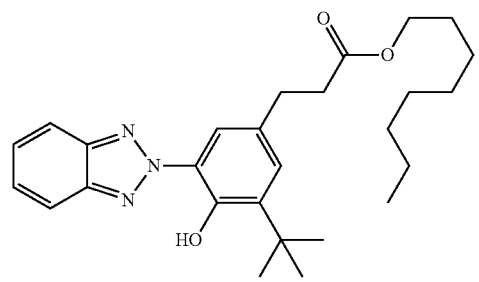 [SMILES: CCCCCCCCOC(=O)CCc1cc(-n2nc3ccccc3n2)c(O)c(C(C)(C)C)c1]
ST-29
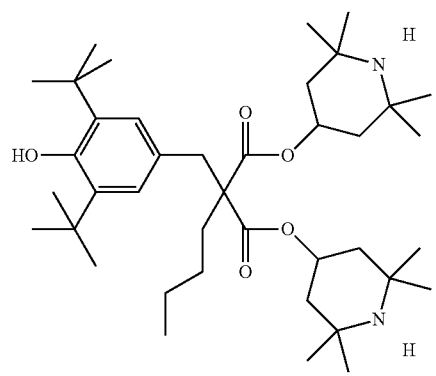
ST-30
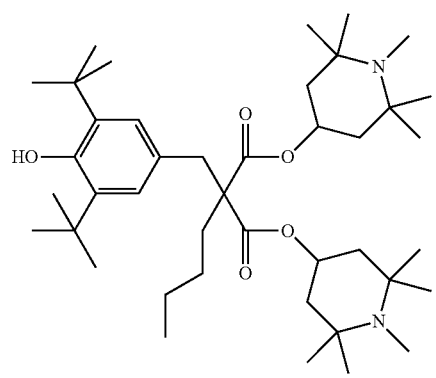 [SMILES: CCCCC(Cc1cc(C(C)(C)C)c(O)c(C(C)(C)C)c1)(C(=O)OC1CC(C)(C)N(C)C(C)(C)C1)C(=O)OC1CC(C)(C)N(C)C(C)(C)C1]
ST-31

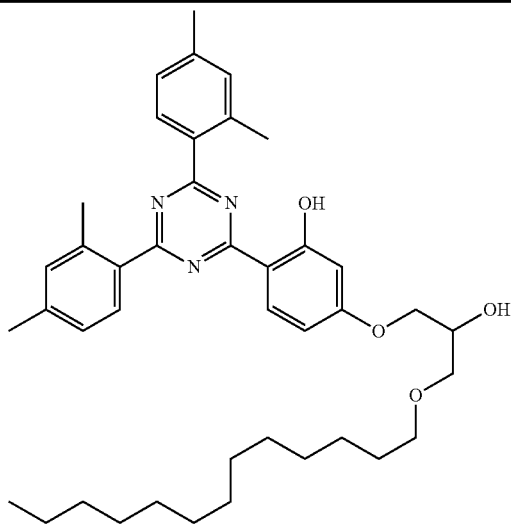
ST-32
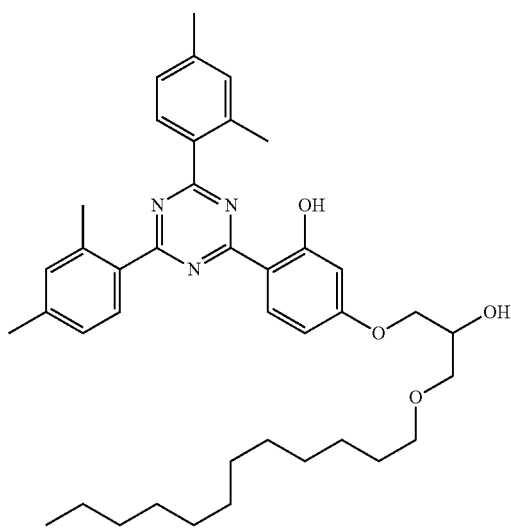 [SMILES: CCCCCCCCCCCCOCC(O)COc1ccc(-c2nc(-c3ccc(C)cc3C)nc(-c3ccc(C)cc3C)n2)c(O)c1]
ST-33
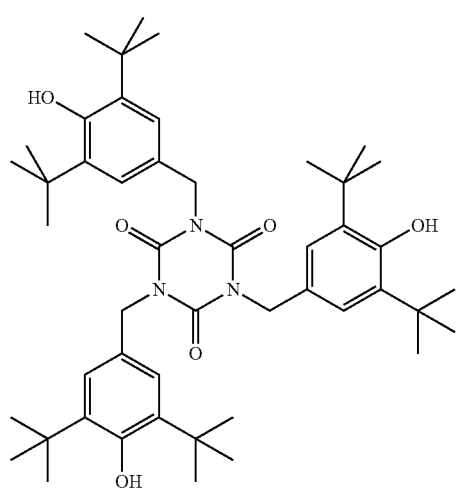 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
ST-34

-continued
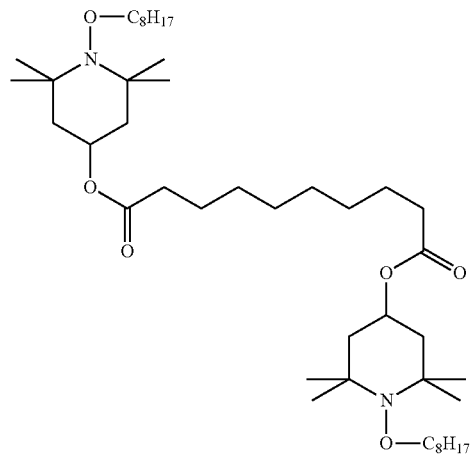
ST-35
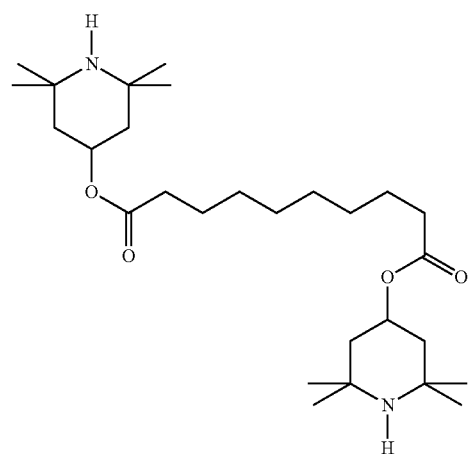
ST-36
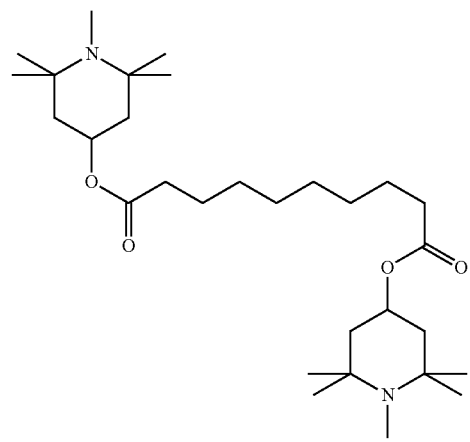
ST-37

-continued
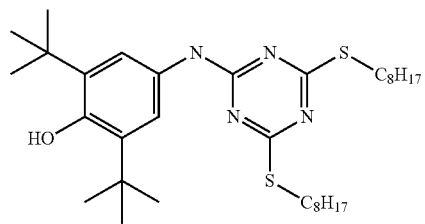
ST-38
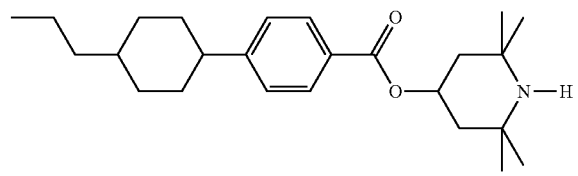 [SMILES: CCCC1CCC(c2ccc(C(=O)OC3CC(C)(C)NC(C)(C)C3)cc2)CC1]
ST-39
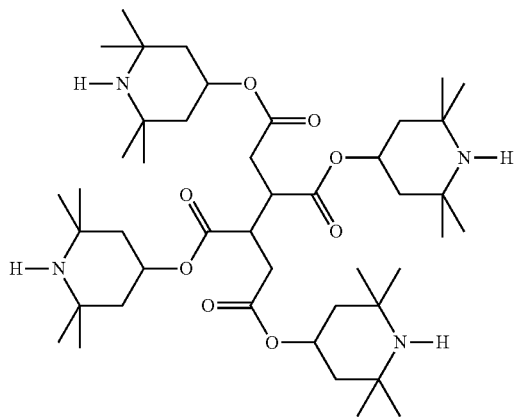 [SMILES: CC1(C)CC(OC(=O)CC(C(=O)OC2CC(C)(C)NC(C)(C)C2)C(CC(=O)OC2CC(C)(C)NC(C)(C)C2)C(=O)OC2CC(C)(C)NC(C)(C)C2)CC(C)(C)N1]
ST-40
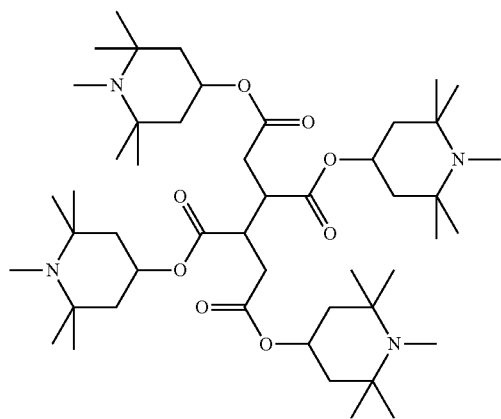
ST-41

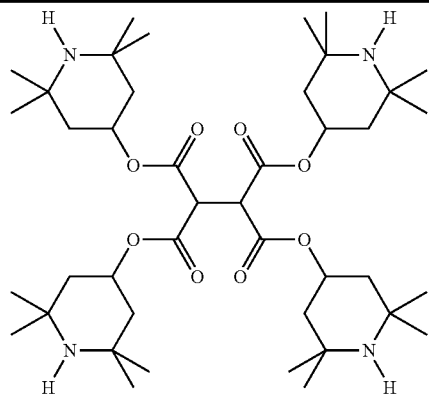

ST-42

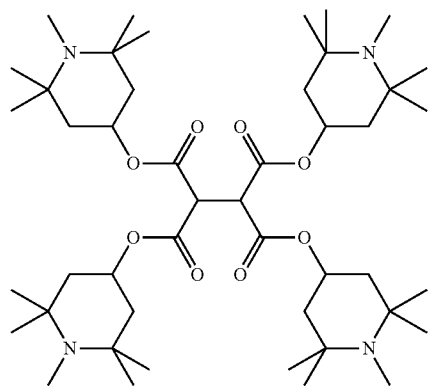

ST-43

The dielectric anisotropy $\Delta\varepsilon$ of the mixture is preferably between −1 and −7, particularly preferably between −2 and −6.

The mixture, as defined above, can in principle be used in any desired optical switching device. The optical switching device can be used in display devices or in switchable windows. Preference is given to the use in switchable windows, in particular in switchable windows which contain a liquid-crystalline material with one or more dichroic dyes.

The mixture according to the invention is preferably used in a device for the homogeneous regulation of the passage of light through an area element, in particular for the regulation of the passage of sunlight. The said device is preferably employed in a switchable window. Homogeneous regulation here is taken to mean that the transmission is substantially the same at all points within the area element.

The invention thus relates to a device for the homogeneous regulation of the passage of light through an area element, where the device contains the mixture according to the invention. The area element here preferably has a dimension of at least 0.05 m², particularly preferably at least 0.1 m², especially preferably at least 0.5 m² and very particularly preferably at least 0.8 m².

The device for the regulation of the passage of light through an area element preferably comprises the mixture in the form of a layer. This layer is preferably switchable, i.e. represents a switching layer. The layer preferably has a thickness of 12 to 40 μm, particularly preferably of 14 to 30 μm and very particularly preferably of 15 to 25 μm.

The device according to the invention is preferably suitable for the regulation of the passage of light in the form of sunlight from the environment into a space. The space here can be any desired space that is substantially sealed off from the environment, for example a building, a vehicle or a container. The device can generally be used for any desired spaces, particularly if these have only limited exchange of air with the environment and have light-transmitting boundary surfaces through which the entry of energy from the outside in the form of light energy can take place. The device is particularly preferably used for spaces which are subjected to strong insolation through light-transmitting areas, for example through window areas. Examples thereof are spaces having large window areas to the outside and the insides of motor vehicles, in particular of automobiles.

The device according to the invention is preferably arranged in an opening of a relatively large two-dimensional structure, where the two-dimensional structure itself only allows little passage of light or none at all, and where the opening transmits light to a greater extent in relative terms. The two-dimensional structure is preferably a wall or another delimitation of a space from the outside.

The device according to the invention is switchable. Switching here is taken to mean a change in the passage of light through the device.

The device according to the invention is preferably electrically switchable. In this case, it preferably comprises two or more electrodes, which are installed on both sides of the layer comprising the mixture according to the invention. The electrodes preferably consist of ITO or a thin, preferably transparent metal and/or metal-oxide layer, for example silver or FTO (fluorine-doped tin oxide), or an alternative material known to the person skilled in the art for this use. The ITO electrodes may be provided with a passivation layer, for example comprising $SiO_2$. The electrodes are preferably provided with electrical connections. The voltage is preferably provided by a battery, a rechargeable battery or an external power supply.

In the case of electrical switching, the switching operation takes place through alignment of the molecules of the mixture in the liquid-crystalline state by application of voltage.

In a preferred embodiment, the device is converted from a state having high absorption, i.e. low light transmissivity, which is present without voltage, into a state having lower absorption, i.e. higher light transmissivity, by application of a voltage. The mixture in the layer in the device is preferably nematically liquid-crystalline in both states. The voltage-free state is preferably characterised in that the molecules of the mixture in the liquid-crystalline state, and thus the molecules of the dye, are aligned parallel to the plane of the switching layer. This is preferably achieved by a correspondingly selected alignment layer. They are particularly preferably in a twisted nematic state parallel to the plane of the switching layer. The twist angle is preferably less than one complete revolution, particularly preferably between 30 and 270°, very particularly preferably between 100° and 260°, even more preferably between 160 and 255° and most preferably between 230 and 250°. The state under voltage is preferably characterised in that the molecules of the mixture in the liquid-crystalline state, and thus the molecules of the dye, are perpendicular to the plane of the switching layer.

According to a preferred embodiment of the invention, the device can be operated without an external power supply by providing the energy required by means of a solar cell or another device for the conversion of light and/or heat energy into electrical energy which is connected to the device. The provision of the energy by means of the solar cell can take place directly or indirectly, i.e. via a battery or rechargeable battery or other unit for the storage of energy connected in-between. The solar cell is preferably installed on the outside of the device or is an internal component of the device, as disclosed, for example, in WO 2009/141295.

The device according to the invention preferably has the following layer sequence, where further layers may additionally be present. The layers indicated below are preferably directly adjacent to one another in the device:

1. substrate layer, preferably made of glass or polymer
   electrically conductive transparent layer, preferably made of ITO
   alignment layer
   switching layer comprising the mixture according to the invention
   alignment layer
   electrically conductive transparent layer, preferably made of ITO
   substrate layer, preferably made of glass or polymer The preferred embodiments of the individual layers are described below.

The device according to the invention preferably comprises one or more, particularly preferably two, alignment layers. The alignment layers are preferably directly adjacent to the two sides of the layer comprising the mixture according to the invention.

The alignment layers used in the device according to the invention can be any desired layers known to the person skilled in the art for this purpose. Preference is given to polyimide layers, particularly preferably layers comprising rubbed polyimide. Polyimide rubbed in a certain manner known to the person skilled in the art results in alignment of the molecules of the mixture in the liquid-crystalline state in the rubbing direction if the molecules are parallel to the alignment layer (planar alignment). It is preferred here for the molecules of the mixture in the liquid-crystalline state not to be completely planar on the alignment layer, but instead to have a slight pretilt angle. In order to achieve vertical alignment of the molecules to the surface of the alignment layer (homeotropic alignment), polyimide treated in a certain manner is preferably employed as material for the alignment layer (polyimide for very high pretilt angles). Furthermore, polymers obtained by an exposure process with polarised light can be used as alignment layer in order to achieve alignment of the molecules in accordance with an alignment axis (photoalignment).

The rubbing directions of the two alignment layers which surround the switching layer comprising the mixture according to the invention in the device according to invention preferably include an angle of 30° to 270°.

The layer comprising the mixture according to the invention in the device according to the invention is furthermore preferably arranged between two substrate layers or enclosed thereby. The substrate layers can consist, for example, of glass or a polymer, preferably a light-transmitting polymer.

The device is preferably characterised in that it does not contain a polymer-based polariser, particularly preferably does not contain a polariser in the solid material phase and very particularly preferably contains no polariser at all.

However, according to an alternative embodiment, the device may also contain one or more polarisers. The polarisers in this case are preferably linear polarisers.

The device according to the invention furthermore preferably contains an optical waveguide system which transports light to a solar cell or another device for the conversion of light and/or heat energy into electrical energy, preferably as described in WO 2009/141295.

In a preferred embodiment, the device according to the invention is a component of a window which can be switched in its light transmission, particularly preferably a window containing at least one glass area, very particularly preferably a window which contains multipane insulating glass.

Window here is taken to mean, in particular, a structure in a building which comprises a frame and at least one glass pane surrounded by this frame. It preferably comprises a heat-insulating frame and two or more glass panes (multipane insulating glass).

According to a preferred embodiment, the device according to the invention is applied directly to a glass area of a window, particularly preferably in the interspace between two glass panes of multipane insulating glass.

WORKING EXAMPLES

Structures of liquid-crystalline compounds are reproduced by abbreviations (acronyms) below. These abbreviations are explicitly presented and explained in WO 2012/052100 (pp. 63-89), so reference is made to the said published application for an explanation of the abbreviations in the present application.

In addition, the following acronyms are used:

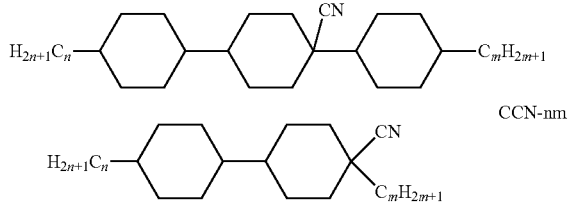

BCN-nm

CCN-nm

All physical properties are determined in accordance with "Merck Liquid Crystals, Physical Properties of Liquid Crystals", Status November 1997, Merck KGaA, Germany, and apply for a temperature of 20° C.

A) Liquid-Crystalline Mixtures Used

The following mixtures according to the invention are prepared:

| M-1 | |
|---|---|
| Cl.p. | 115.5 |
| Δn (20° C., 589.3 nm) | 0.0475 |
| $n_e$ (20° C., 589.3 nm) | 1.5252 |
| $n_o$ (20° C., 589.3 nm) | 1.4777 |
| Δε (20° C., 1 kHz) | −5.6 |
| ε_parallel (20° C., 1 kHz) | 3.4 |
| ε_perpendicular (20° C., 1 kHz) | 9.0 |

| Composition | Compound | % |
|---|---|---|
| | CCN-47 | 14 |
| | CCN-55 | 14 |
| | CCN-33 | 2 |
| | CCZC-3-3 | 3 |
| | CCZC-3-5 | 3 |
| | CC-3-O1 | 11 |
| | CC-5-O1 | 5 |
| | CC-5-O2 | 4 |
| | CCY-3-O2 | 3 |
| | CCY-5-O2 | 3 |
| | BCN-35 | 12 |
| | BCN-55 | 14 |
| | BCN-53 | 12 |

| M-2 | |
|---|---|
| Cl.p. | 114.6 |
| Δn (20° C., 589.3 nm) | 0.0454 |
| $n_e$ (20° C., 589.3 nm) | 1.5230 |
| $n_o$ (20° C., 589.3 nm) | 1.4776 |
| Δε (20° C., 1 kHz) | −5.2 |
| ε_parallel (20° C., 1 kHz) | 3.33 |
| ε_perpendicular (20° C., 1 kHz) | 8.49 |

| Composition | Compound | % |
|---|---|---|
| | CCN-47 | 14 |
| | CCN-55 | 14 |
| | CCN-33 | 6 |
| | CCZC-3-3 | 3 |
| | CCZC-3-5 | 3 |
| | CCZC-4-3 | 3 |
| | CCZC-4-5 | 3 |
| | CC-3-O1 | 11 |
| | CC-5-O1 | 4 |
| | CC-5-O2 | 4 |
| | BCN-35 | 10 |
| | BCN-55 | 12 |
| | BCN-53 | 10 |
| | CCZPC-3-3 | 3 |

| M-3 | |
|---|---|
| Cl.p. | 113.0 |
| Δn (20° C., 589.3 nm) | 0.0499 |
| $n_e$ (20° C., 589.3 nm) | 1.5299 |
| $n_o$ (20° C., 589.3 nm) | 1.4800 |
| Δε (20° C., 1 kHz) | −5.1 |
| ε_parallel (20° C., 1 kHz) | 3.26 |
| ε_perpendicular (20° C., 1 kHz) | 8.37 |

| Composition | Compound | % |
|---|---|---|
| | CCN-47 | 14 |
| | CCN-55 | 14 |
| | CCN-33 | 5 |
| | CCZC-3-3 | 2 |
| | CCZC-3-5 | 3 |
| | CC-2-3 | 6 |
| | CC-3-4 | 5 |
| | CP-3-O2 | 11 |
| | BCN-35 | 11 |
| | BCN-55 | 14 |
| | BCN-53 | 11 |
| | CCZCC-2-3 | 2 |
| | CCZCC-3-2 | 2 |

| M-4 | |
|---|---|
| Cl.p. | 114.0 |
| Δn (20° C., 589.3 nm) | 0.0518 |
| $n_e$ (20° C., 589.3 nm) | 1.5317 |
| $n_o$ (20° C., 589.3 nm) | 1.4799 |
| Δε (20° C., 1 kHz) | −4.9 |
| ε_parallel (20° C., 1 kHz) | 3.32 |
| ε_perpendicular (20° C., 1 kHz) | 8.17 |

| Composition | Compound | % |
|---|---|---|
| | CCN-47 | 14 |
| | CCN-55 | 14 |
| | CCN-33 | 5 |
| | CCZC-3-3 | 2 |
| | CCZC-3-5 | 3 |
| | CCZC-4-3 | 2 |
| | CC-3-O1 | 6 |
| | CC-5-O1 | 5 |
| | CP-3-O2 | 11 |
| | BCN-35 | 9 |
| | BCN-55 | 12 |
| | BCN-53 | 9 |
| | CCZCC-2-3 | 2 |
| | CCZCC-3-2 | 2 |
| | CCZPC-3-3 | 2 |
| | CCZPC-3-4 | 2 |

| M-5 | |
|---|---|
| Cl.p. | 111.0 |
| Δn (20° C., 589.3 nm) | 0.0450 |
| $n_e$ (20° C., 589.3 nm) | 1.5224 |
| $n_o$ (20° C., 589.3 nm) | 1.4774 |
| Δε (20° C., 1 kHz) | −4.9 |
| ε_parallel (20° C., 1 kHz) | 3.24 |
| ε_perpendicular (20° C., 1 kHz) | 8.10 |

-continued

| Composition | Compound | % |
|---|---|---|
| | CCN-47 | 14 |
| | CCN-55 | 14 |
| | CCN-33 | 5 |
| | CCZC-3-3 | 3 |
| | CCZC-3-5 | 3 |
| | CCZC-4-3 | 3 |
| | CCZC-4-5 | 3 |
| | CC-2-3 | 6 |
| | CC-3-4 | 5 |
| | CC-3-O1 | 11 |
| | BCN-35 | 10 |
| | BCN-55 | 12 |
| | BCN-53 | 10 |
| | CCZPC-3-3 | 2 |

M-6

| Cl.p. | 116.0 |
|---|---|
| Δn (20° C., 589.3 nm) | 0.0448 |
| $n_e$ (20° C., 589.3 nm) | 1.5240 |
| $n_o$ (20° C., 589.3 nm) | 1.4792 |
| Δε (20° C., 1 kHz) | −5.4 |
| ε_parallel (20° C., 1 kHz) | 3.42 |
| ε_perpendicular (20° C., 1 kHz) | 8.80 |

| Composition | Compound | % |
|---|---|---|
| | CCN-47 | 15 |
| | CCN-55 | 15 |
| | CCN-33 | 11 |
| | CC-3-O1 | 11 |
| | CC-5-O1 | 5 |
| | CC-5-O2 | 2 |
| | CCZCC-2-3 | 2 |
| | CCZCC-3-2 | 2 |
| | CCZCC-4-2 | 2 |
| | BCN-35 | 10 |
| | BCN-55 | 10 |
| | BCN-53 | 8 |
| | CCZPC-3-3 | 3 |
| | CCZPC-3-4 | 2 |
| | CCZPC-3-5 | 2 |

M-7

| Cl.p. | 113.0 |
|---|---|
| Δn (20° C., 589.3 nm) | 0.0443 |
| $n_e$ (20° C., 589.3 nm) | 1.5227 |
| $n_o$ (20° C., 589.3 nm) | 1.4784 |
| Δε (20° C., 1 kHz) | −5.4 |
| ε_parallel (20° C., 1 kHz) | 3.41 |
| $ε_⊥$ (20° C., 1 kHz) | 8.82 |

| Composition | Compound | % |
|---|---|---|
| | CCN-47 | 15 |
| | CCN-55 | 15 |
| | CCN-33 | 11 |
| | CCZC-3-3 | 3 |
| | CCZC-3-5 | 3 |
| | CCZC-4-3 | 3 |
| | CCZC-4-5 | 3 |
| | CC-3-O1 | 11 |
| | CC-5-O1 | 2 |
| | BCN-35 | 14 |
| | BCN-55 | 14 |
| | CCOCC-3-2 | 2 |
| | CCOCC-2-3 | 2 |
| | CCOCC-4-2 | 2 |

M-8

| Cl.p. | 117.5 |
|---|---|
| $n_e$ (20° C., 589.3 nm) | 1.5222 |
| $n_o$ (20° C., 589.3 nm) | 1.4779 |
| Δn (20° C., 589.3 nm) | 0.0443 |
| ε_parallel (20° C., 1 kHz) | 3.39 |
| ε_perpendicular (20° C., 1 kHz) | 8.94 |
| Δε (20° C., 1 kHz) | −5.5 |

| Composition | Compound | % |
|---|---|---|
| | CCN-47 | 15 |
| | CCN-55 | 15 |
| | CCN-33 | 8 |
| | CC-3-O1 | 11 |
| | CC-5-O1 | 5 |
| | CCZC-3-3 | 3 |
| | CCZC-3-5 | 3 |
| | CCZCC-2-3 | 2 |
| | CCZCC-3-2 | 2 |
| | CCZCC-4-2 | 2 |
| | CCZCC-4-3 | 2 |
| | BCN-35 | 16 |
| | BCN-55 | 16 |

M-9

| Cl.p. (° C.) | 111 |
|---|---|
| Δn (20° C., 589.3 nm) | 0.068 |
| Δε (20° C., 1 kHz) | −5.1 |

| Composition | Compound | % |
|---|---|---|
| | CCN-47 | 15 |
| | CCN-55 | 15 |
| | CY-3-O4 | 11 |
| | CCY-3-O2 | 8 |
| | CCY-3-O3 | 9 |
| | CCY-5-O2 | 10 |
| | CCY-3-1 | 4 |
| | CCZC-3-3 | 3 |
| | CCZC-3-5 | 3 |
| | CCZC-4-3 | 3 |
| | CC-3-O1 | 11 |
| | CCZCC-2-3 | 2 |
| | CCZCC-3-2 | 2 |
| | CCZCC-4-2 | 2 |
| | CCZCC-4-3 | 2 |

M-10

| Cl.p. | 127 |
|---|---|
| Δn (20° C., 589.3 nm) | 0.060 |
| Δε (20° C., 1 kHz) | −4.6 |

| Composition | Compound | % |
|---|---|---|
| | CY-3-O4 | 12 |
| | CCY-3-O2 | 8 |
| | CCY-5-O2 | 9 |
| | CCZC-3-3 | 3 |
| | CCZC-3-5 | 2 |
| | CC-3-O1 | 11 |
| | CC-5-O1 | 10 |
| | CC-5-O2 | 5 |
| | BCN-35 | 16 |
| | BCN-55 | 16 |
| | CCZPC-3-3 | 2 |
| | CCZCC-2-3 | 2 |
| | CCZCC-3-2 | 2 |
| | CCZCC-4-2 | 2 |

M-11

| | | |
|---|---|---|
| Cl.p. (° C.) | | 115 |
| Δn (20° C., 589.3 nm) | | 0.053 |
| Δε (20° C., 1 kHz) | | −3.9 |

| Composition | Compound | % |
|---|---|---|
| | CY-3-O4 | 12 |
| | CCY-3-O2 | 8 |
| | CCZC-3-3 | 3 |
| | CCZC-3-5 | 2 |
| | CCZC-4-3 | 2 |
| | CCZC-4-5 | 2 |
| | CC-3-O1 | 9 |
| | CC-3-O3 | 9 |
| | CC-5-O1 | 10 |
| | CC-5-O2 | 5 |
| | BCN-35 | 16 |
| | BCN-55 | 16 |
| | CCZPC-3-3 | 2 |
| | CCZCC-2-3 | 2 |
| | CCZCC-3-2 | 2 |

M-12

| | | |
|---|---|---|
| Cl.p. (° C.) | | 117.5 |
| Δn (20° C., 589.3 nm) | | 0.0443 |
| Δε (20° C., 1 kHz) | | −5.5 |

| Composition | Compound | % |
|---|---|---|
| | CCN-47 | 15 |
| | CCN-55 | 15 |
| | CCN-33 | 8 |
| | CCZC-3-3 | 3 |
| | CCZC-3-5 | 3 |
| | CC-3-O1 | 11 |
| | CC-5-O1 | 5 |
| | CCZCC-2-3 | 2 |
| | CCZCC-3-2 | 2 |
| | CCZCC-4-2 | 2 |
| | CCZCC-4-3 | 2 |
| | BCN-35 | 16 |
| | BCN-55 | 16 |

M-13

| | | |
|---|---|---|
| Cl.p. (° C.) | | 108 |
| Δn (20° C., 589.3 nm) | | 0.061 |
| Δε (20° C., 1 kHz) | | −5.6 |

| Composition | Compound | % |
|---|---|---|
| | CCN-47 | 15 |
| | CCN-55 | 15 |
| | CCY-3-O3 | 3 |
| | CCY-3-O2 | 8 |
| | CCY-5-O2 | 10 |
| | CY-3-O4 | 9 |
| | CCZC-3-3 | 3 |
| | CCZC-3-5 | 3 |
| | CC-3-O1 | 11 |
| | CC-5-O1 | 4 |
| | BCN-55 | 15 |
| | CCZPC-3-3 | 2 |
| | CCZPC-3-4 | 2 |

M-14

| | | |
|---|---|---|
| Cl.p. (° C.) | | 108 |
| Δn (20° C., 589.3 nm) | | 0.060 |
| Δε (20° C., 1 kHz) | | −5.4 |

| Composition | Compound | % |
|---|---|---|
| | CCN-47 | 15 |
| | CCN-55 | 15 |
| | CCY-3-O2 | 8 |
| | CY-3-O2 | 12 |
| | CCZC-3-3 | 3 |
| | CC-3-O1 | 11 |
| | BCN-35 | 16 |
| | BCN-55 | 16 |
| | CCZPC-3-3 | 2 |
| | CCZPC-3-4 | 2 |

M-15

| | | |
|---|---|---|
| Cl.p. (° C.) | | 107 |
| Δn (20° C., 589.3 nm) | | 0.054 |
| Δε (20° C., 1 kHz) | | −6.5 |

| Composition | Compound | % |
|---|---|---|
| | CCN-47 | 15 |
| | CCN-55 | 15 |
| | CCY-3-O2 | 8 |
| | CCY-5-O2 | 10 |
| | CY-3-O2 | 12 |
| | CCZC-3-3 | 3 |
| | CC-3-O1 | 11 |
| | BCN-35 | 11 |
| | BCN-55 | 11 |
| | CCZPC-3-3 | 2 |
| | CCZPC-3-4 | 2 |

M-16

| | | |
|---|---|---|
| Cl.p. (° C.) | | 112 |
| Δn (20° C., 589.3 nm) | | 0.051 |
| Δε (20° C., 1 kHz) | | −5.4 |

| Composition | Compound | % |
|---|---|---|
| | CCN-47 | 15 |
| | CCN-55 | 15 |
| | CCY-3-O2 | 8 |
| | CCZC-3-3 | 3 |
| | CC-3-O1 | 11 |
| | CC-5-O1 | 9 |
| | CC-5-O2 | 3 |
| | BCN-35 | 16 |
| | BCN-55 | 16 |
| | CCZPC-3-3 | 2 |
| | CCZPC-3-4 | 2 |

B) Dyes Used

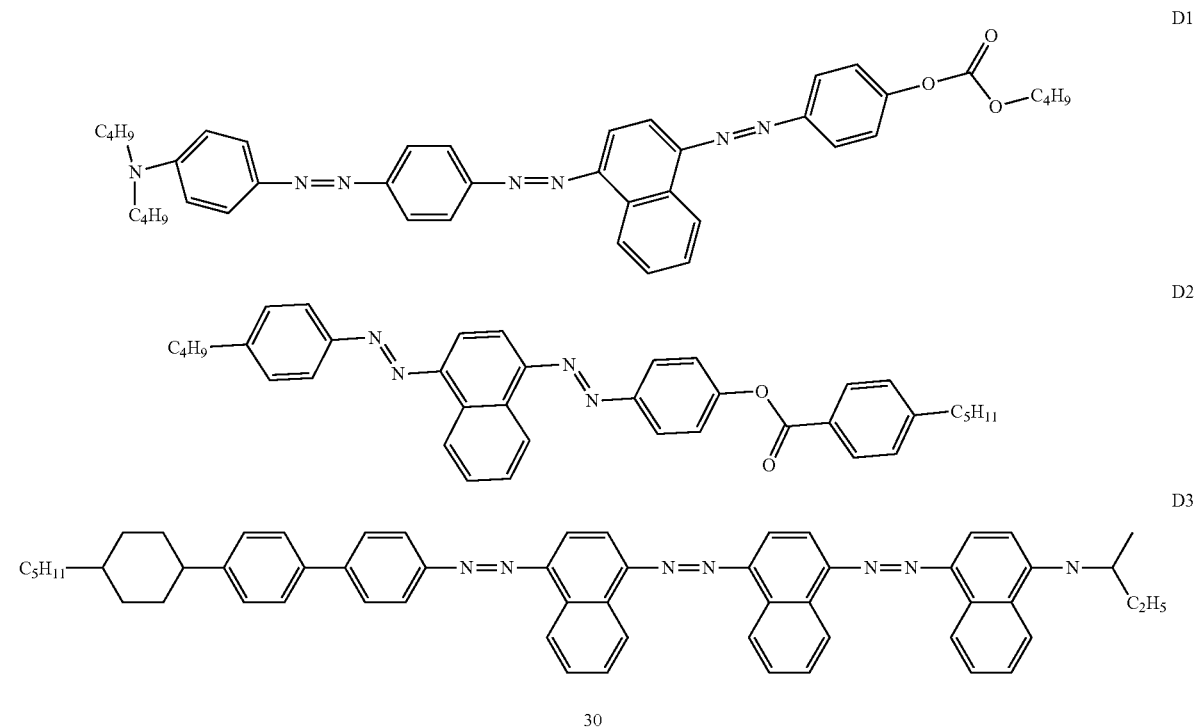

C) Measurement of the Shelf Life of the Mixtures

The mixtures prepared have a long shelf life at low temperatures. The shelf life is determined by storing the samples at the temperature in question and determining the time period during which no visible crystallisation or decomposition occurs. The following data are measured for the shelf life:

| M-2 | |
| --- | --- |
| Shelf life (bulk, −20° C.) | >214 days |
| Shelf life (bulk, −30° C.) | >214 days |
| Shelf life (bulk, −40° C.) | 53 days |
| M-3 | |
| Shelf life (bulk, −20° C.) | >214 days |
| Shelf life (bulk, −30° C.) | >214 days |
| Shelf life (bulk, −40° C.) | 96 days |
| M-4 | |
| Shelf life (bulk, −20° C.) | >214 days |
| Shelf life (bulk, −30° C.) | >214 days |
| Shelf life (bulk, −40° C.) | 120 days |
| M-5 | |
| Shelf life (bulk, −20° C.) | >209 days |
| Shelf life (bulk, −30° C.) | >209 days |
| Shelf life (bulk, −40° C.) | 59 days |
| M-6 | |
| Shelf life (bulk, −20° C.) | >209 days |
| Shelf life (bulk, −30° C.) | >209 days |
| Shelf life (bulk, −40° C.) | >209 days |
| M-8 | |
| Shelf life (bulk, −20° C.) | >204 days |
| Shelf life (bulk, −30° C.) | >204 days |
| Shelf life (bulk, −40° C.) | >204 days |

D) Use Examples

Switching devices containing the mixtures according to the invention are produced. These have the following layer sequence:

a) glass layer comprising polished 1.1 mm soda-lime glass from Corning b) ITO layer, 200 Ångström c) alignment layer O1 comprising polyimide JALS-2096-R1 from JSR, rubbed d) switchable layer comprising liquid-crystalline medium (composition and thickness indicated below in the case of the corresponding examples)

e) alignment layer O2, structure as in c); rubbed at the angle indicated below to the rubbing direction of layer c)

f) as for b)

g) as for a)

The ITO layers are provided correspondingly with contacts in order to be electrically switchable.

Example 1

0.33% of D1, 0.50% of B2 and 0.60% of D3 are added to 98.57% of mixture M-12. 0.524% of chiral dopant S-811 is added to 99.476% of this mixture. The pitch is 23.1 μm.

The mixture is introduced into the device described above with a layer thickness of 15.4 μm. The tilt angle of the cell is 88.5° relative to the substrate plane. The twist (angle between the rubbing directions of O1 and O2) is 240°.

The following values for the light transmittance are obtained for the device at an operating temperature of 20° C.:

| $\tau_V$ dark state [%] | $\tau_V$ bright state [%] | $\Delta\tau_V$ [%] |
|---|---|---|
| 22.9 | 72.7 | 49.8 |

The light transmittance $\tau_V$ is determined in accordance with European Standard EN410, equation (1) (Determination of luminous and solar characteristics of glazing) from the measured spectral transmittances taking into account the relative spectral distribution of the standard illuminant and the spectral brightness sensitivity of the standard observer.

The example shows a large range of the light transmittance ($\Delta\tau_V$) of 49.8%. Only few visible streaks from the glass waviness and only few particle defects are evident.

Example 2

0.6% of D1, 0.85% of B2 and 1.2% of D3 are added to 97.35% of mixture M-2. 0.522% of chiral dopant S-811 is added to 99.478% of this mixture. The pitch is 22.4 μm.

The mixture is introduced into the device described above with a layer thickness of 15 μm. The tilt angle of the cell is 88° relative to the substrate plane. The twist (angle between the rubbing directions of O1 and O2) is 240°.

The following values for the light transmittance are obtained for the device at operating temperatures between 20° C. and 100° C.:

| Temperature | $\tau_V$ bright state [%] | $\tau_V$ dark state [%] | $\Delta\tau_V$ [%] |
|---|---|---|---|
| 20° C. | 48.0 | 10.0 | 38.0 |
| 40° C. | 45.2 | 9.6 | 35.6 |
| 60° C. | 41.7 | 10.7 | 31.0 |
| 80° C. | 37.2 | 11.0 | 26.2 |
| 100° C. | 30.5 | 9.7 | 20.8 |

This example shows that the functioning ability of the devices is retained with the mixtures according to the invention within a broad temperature range, in particular at temperatures of 100° C., in particular substantially constant values for the light transmission in the bright and dark states are retained.

The invention claimed is:

1. A switchable window comprising:
a layer which comprises a mixture comprising one or more compounds of formula (1) or a formula (2),

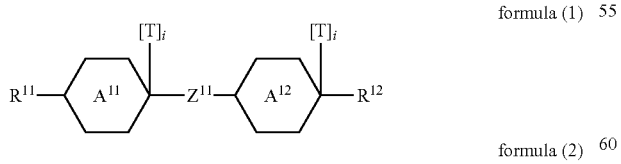

formula (1)

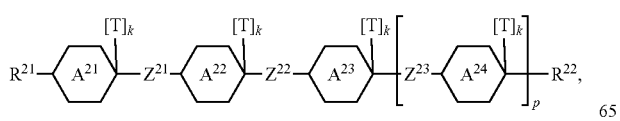

formula (2)

where:

$A^{11}, A^{12}, A^{21}, A^{22}, A^{23}, A^{24}$ are from

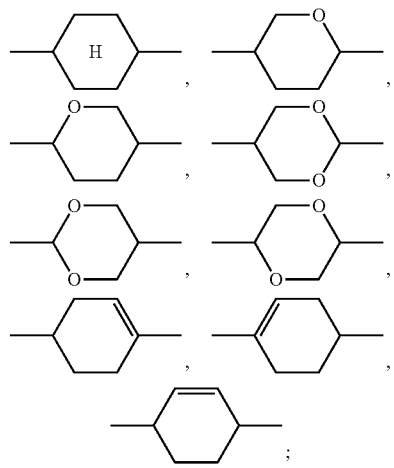

;

$Z^{11}, Z^{21}, Z^{22}, Z^{23}$ are a single bond, —(C=O)—O, —O—(C=O)—, —CF$_2$—O—, —O—CF$_2$—, —O—CH$_2$—, —CH$_2$—O— or —CH$_2$—CH$_2$—;

$R^{11}, R^{12}, R^{21}, R^{22}$ are on each occurrence, identically or differently, H, F, Cl, CN, NCS, alkyl groups having 1 to 10 C atoms, alkoxy groups having 1 to 10 C atoms, thioalkoxy groups having 1 to 10 C atoms, alkenyl groups having 2 to 10 C atoms and alkenyloxy groups having 2 to 10 C atoms, where one or more H atoms in the alkyl, alkoxy, thioalkoxy, alkenyl a or alkenyloxy groups may be replaced by F, Cl or CN;

T is —CN, F, —N$_3$, —NCS, NO$_2$, —C≡C—R$^3$, alkyl groups having 1 to 10 C atoms or alkoxy groups having 1 to 10 C atoms, where one or more H atoms in the alkyl and alkoxy groups may be replaced by F, Cl or CN;

$R^3$ is H, CN, alkyl groups having 1 to 10 C atoms, where one or more C atoms in the alkyl groups may be replaced by F, Cl or CN, or —C≡C—R$^4$;

$R^4$ is H, CN, or alkyl groups having 1 to 10 C atoms, where one or more C atoms in the alkyl groups may be replaced by F, Cl or CN;

i is on each occurrence, identically or differently, 0 or 1, where the sum of the indices i in a formula is at least equal to 1;

k is on each occurrence, identically or differently, 0 or 1, where the sum of the indices k in a formula is at least equal to 1;

p is equal to 0 or 1;

and one or more compounds of the formula (3)

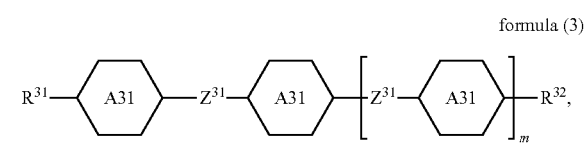

formula (3)

wherein

A31 is on each occurrence, identically or differently,

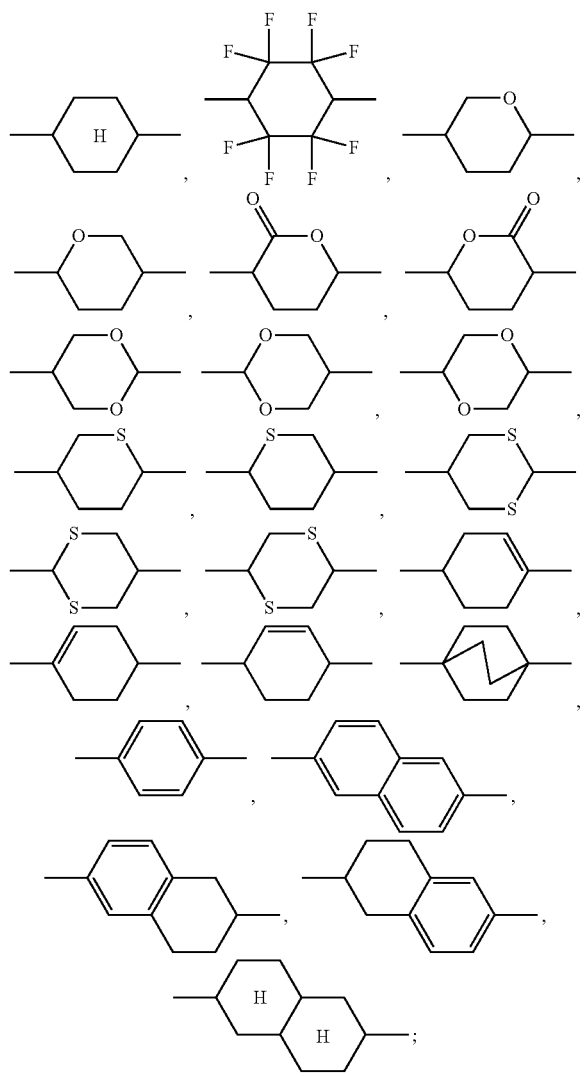

R³¹ and R³² are on each occurrence, identically or differently, H, F, Cl, CN, NCS, alkyl groups having 1 to 10 C atoms, alkoxy groups having 1 to 10 C atoms, thioalkoxy groups having 1 to 10 C atoms, alkenyl groups having 2 to 10 C atoms and alkenyloxy groups having 2 to 10 C atoms, where one or more H atoms in the alkyl, alkoxy, thioalkoxy, alkenyl or alkenyloxy groups may be replaced by F, Cl or CN;

Z³¹ is on each occurrence, identically or differently, a single bond, —(C=O)—O—, —O—(C=O)—, —CF₂—O—, —O—CF₂—, —O—CH₂—, —CH₂—O— or —CH₂—CH₂—;

m is equal to 0, 1, 2 or 3;

where the sum of the proportions of the compounds of the formula (1), the compounds of the formula (2) and the compounds of the formula (3) in the mixture is at least 58%, and where one or both of the following conditions a) and b) are satisfied:

a) the mixture comprises one or more compounds V which contain four or more rings, b) the mixture comprises a proportion of at least 25% of compounds of the formula (2)

and wherein said layer is present in a switchable window and said mixture has a clearing point of at least 105° C.

2. The switchable window according to claim 1, wherein the compound of the formula (1) is a compound of formula (1-1)

formula (1-1)

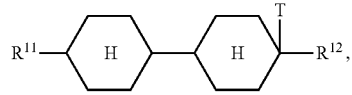

where T, R¹¹ and R¹² are defined as in claim 1.

3. The switchable window according to claim 1, wherein the compound of the formula (2) is a compound of formula (2-1), (2-2), (2-3) or (2-4)

formula (2-1)

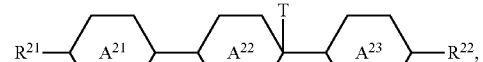

formula (2-2)

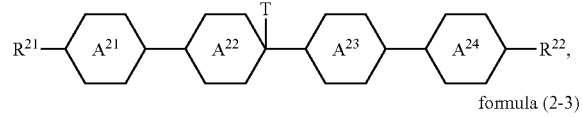

formula (2-3)

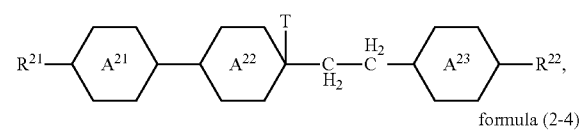

formula (2-4)

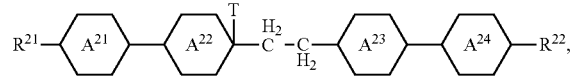

where R²¹, R²², A²¹, A²², A²³, A²⁴ and T are defined as in claim 1.

4. The switchable window according to claim 1, wherein the compound of the formula (2) is a compound of formula (2-1-1)

formula (2-1-1)

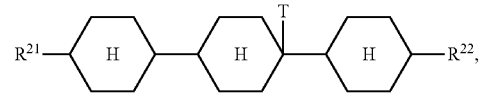

where R²¹, R²² and T are defined as claim 1.

5. The switchable window according to claim 4, wherein said mixture has a proportion of at least 25% of compounds of the formula (2-1-1).

6. The switchable window according to claim 1, wherein the compound V is a compound of formula (V-1)

formula (V-1)

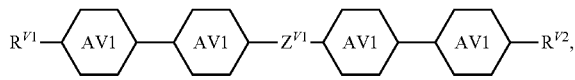

where
Z$^{v1}$ is from —(C=O)—O— or —CH$_2$—O—, and where
AV1 is on each occurrence, identically or differently, from

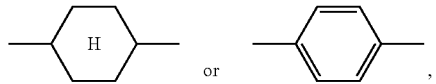

and where R$^{v1}$ and R$^{v2}$ are on each occurrence, identically or differently, from H, F, Cl, CN, NCS, alkyl groups having 1 to 10 C atoms, alkoxy groups having 1 to 10 C atoms, thioalkoxy groups having 1 to 10 C atoms, alkenyl groups having 2 to 10 C atoms and alkenyloxy groups having 2 to 10 C atoms, where one or more H atoms in the alkyl, alkoxy, thioalkoxy, alkenyl or alkenyloxy groups may be replaced by F, Cl or CN.

7. The switchable window according to claim 1, wherein the compound of the formula (3) is a compound of formulae (3-A), (3-B) or (3-C)

formula (3-A)

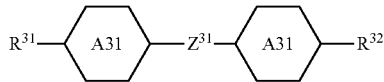

formula (3-B)

formula (3-C)

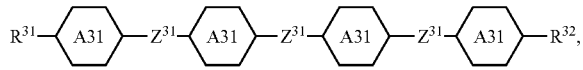

where R$^{31}$, R$^{32}$, Z$^{31}$ and A$^{31}$ are defined as in claim 1.

8. The switchable window according to claim 1, wherein A$^{31}$ in formulae (3) is on each occurrence, identically or differently,

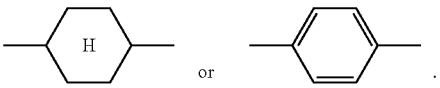

9. The switchable window according to claim 1, wherein it comprises one or more compounds of the formula (3-1)

formula (3-1)

where R$^{31}$, R$^{32}$, Z$^{31}$ and m are defined as in claim 1, and where A$^{31\text{-}1}$ is on each occurrence, identically or differently,

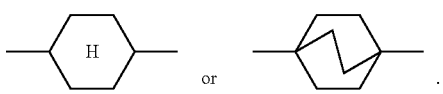

10. The switchable window according to claim 1, wherein said mixture comprises both one or more compounds of the formula (1) and also one or more compounds of the formula (2).

11. The switchable window according to claim 1, wherein compounds of the formula (1) are present in the mixture in a proportion of at least 25%.

12. The switchable window according to claim 1, wherein compounds of the formula (2) are present in the mixture in a proportion of at least 25%.

13. The switchable window according to claim 1, wherein the sum formed from the proportions of the compounds of the formula (1), formula (2) and formula (3) in said mixture is greater than 95%.

14. The switchable window according to claim 1, wherein said mixture comprises a proportion of less than 60% of compounds which contain one or more benzene rings.

15. The switchable window according to claim 1, wherein said mixture further comprises one or more dyes.

16. The switchable window according to claim 1, wherein it comprises one or more dyes that are azo compounds, anthraquinones, benzothiadiazoles, diketopyrrolopyrroles or rylenes.

17. The switchable window according to claim 1, wherein said mixture has a value of Δn of less than 0.065.

18. The switchable window according to claim 1, wherein said mixture has a value of Δn of less than 0.055.

19. The switchable window according to claim 16, wherein said mixture comprises at least dye which absorbs blue light, at least one dye which absorbs green to yellow light and at least one dye which absorbs red light.

20. The switchable window according to claim 1, wherein said clearing point is of at least 110° C.

* * * * *